US007250726B2

(12) United States Patent
Ball

(10) Patent No.: US 7,250,726 B2
(45) **Date of Patent: *Jul. 31, 2007**

(54) SYSTEMS AND METHODS FOR A TRANSFORMER CONFIGURATION WITH A TREE TOPOLOGY FOR CURRENT BALANCING IN GAS DISCHARGE LAMPS

(75) Inventor: Newton E. Ball, Anaheim, CA (US)

(73) Assignee: Microsemi Corporation, Irvine, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 10/970,243

(22) Filed: Oct. 20, 2004

(65) Prior Publication Data

US 2005/0093482 A1 May 5, 2005

Related U.S. Application Data

(60) Provisional application No. 60/512,974, filed on Oct. 21, 2003.

(51) Int. Cl.
*H01J 7/44* (2006.01)
*H05B 37/02* (2006.01)
*H05B 41/16* (2006.01)
*H02H 7/04* (2006.01)

(52) U.S. Cl. .......................... 315/57; 315/70; 315/210; 315/220; 315/255; 315/277; 361/38

(58) Field of Classification Search .................. 315/57, 315/70, 210, 219, 220, 250, 255, 277, 291, 315/312; 361/35, 38, 270
See application file for complete search history.

(56) References Cited

U.S. PATENT DOCUMENTS 2,429,162 A * 10/1947 Russell et al. .............. 315/282
2,440,984 A 5/1948 Summers (Continued)

FOREIGN PATENT DOCUMENTS

JP 06168791 A 6/1994

(Continued)

OTHER PUBLICATIONS

International Search report for Application No. PCT/US04/34649 (the PCT counterpart of the parent application). Mailed May 26, 2006.

(Continued)

*Primary Examiner*—Thuy Vinh Tran
(74) *Attorney, Agent, or Firm*—Knobbe, Martens, Olson & Bear LLP

(57) ABSTRACT

An apparatus and methods for balancing current in multiple negative impedance gas discharge lamp loads. Embodiments advantageously include balancing transformer configurations that are relatively cost-effective, reliable, efficient, and good performing. Embodiments include configurations that are applicable to any number of gas discharge tubes, such as cold cathode fluorescent lamps. The balancing transformer configuration techniques permit a relatively small number of power inverters, such as one power inverter, to power multiple lamps in parallel. One embodiment of a balancing transformer includes a safety winding which can be used to protect the balancing transformer in the event of a lamp failure and can be used to provide an indication of a failed lamp.

24 Claims, 27 Drawing Sheets

U.S. PATENT DOCUMENTS

| | | | |
|---|---|---|---|
| 2,572,258 | A | 10/1951 | Goldfield et al. |
| 2,965,799 | A | 12/1960 | Brooks et al. |
| 2,968,028 | A | 1/1961 | Eilichi et al. |
| 3,141,112 | A | 7/1964 | Eppert |
| 3,597,656 | A | 8/1971 | Douglas |
| 3,611,021 | A | 10/1971 | Wallace |
| 3,683,923 | A | 8/1972 | Anderson |
| 3,737,755 | A | 6/1973 | Calkin et al. |
| 3,742,330 | A | 6/1973 | Hodges et al. |
| 3,936,696 | A | 2/1976 | Gray |
| 3,944,888 | A | 3/1976 | Clark |
| 4,060,751 | A | 11/1977 | Anderson |
| 4,353,009 | A | 10/1982 | Knoll |
| 4,388,562 | A | 6/1983 | Josephson |
| 4,441,054 | A | 4/1984 | Bay |
| 4,463,287 | A | 7/1984 | Pitel |
| 4,523,130 | A | 6/1985 | Pitel |
| 4,567,379 | A | 1/1986 | Corey et al. |
| 4,572,992 | A | 2/1986 | Masaki |
| 4,574,222 | A | 3/1986 | Anderson |
| 4,622,496 | A | 11/1986 | Dattilo et al. |
| 4,630,005 | A | 12/1986 | Clegg et al. |
| 4,663,566 | A | 5/1987 | Nagano |
| 4,663,570 | A | 5/1987 | Luchaco et al. |
| 4,672,300 | A | 6/1987 | Harper |
| 4,675,574 | A | 6/1987 | Delflache |
| 4,686,615 | A | 8/1987 | Ferguson |
| 4,698,554 | A | 10/1987 | Stupp |
| 4,700,113 | A | 10/1987 | Stupp et al. |
| 4,761,722 | A | 8/1988 | Pruitt |
| 4,766,353 | A | 8/1988 | Burgess |
| 4,780,696 | A | 10/1988 | Jirka |
| 4,847,745 | A | 7/1989 | Shekhawat et al. |
| 4,862,059 | A | 8/1989 | Tominaga et al. |
| 4,893,069 | A | 1/1990 | Harada et al. |
| 4,939,381 | A | 7/1990 | Shibata |
| 5,023,519 | A | 6/1991 | Jensen |
| 5,030,887 | A | 7/1991 | Guisinger |
| 5,036,255 | A | 7/1991 | McKnight et al. |
| 5,057,808 | A | 10/1991 | Dhyanchand |
| 5,173,643 | A | 12/1992 | Sullivan et al. |
| 5,349,272 | A | 9/1994 | Rector |
| 5,434,477 | A | 7/1995 | Crouse et al. |
| 5,475,284 | A | 12/1995 | Lester et al. |
| 5,485,057 | A | 1/1996 | Smallwood et al. |
| 5,519,289 | A | 5/1996 | Katyl et al. |
| 5,539,281 | A | 7/1996 | Shackle et al. |
| 5,557,249 | A | 9/1996 | Reynal |
| 5,563,473 | A | 10/1996 | Mattas et al. |
| 5,574,335 | A | 11/1996 | Sun |
| 5,574,356 | A | 11/1996 | Parker |
| 5,615,093 | A | 3/1997 | Nalbant |
| 5,619,402 | A | 4/1997 | Liu |
| 5,621,281 | A | 4/1997 | Kawabata et al. |
| 5,652,479 | A | 7/1997 | LoCascio et al. |
| 5,712,776 | A | 1/1998 | Palara et al. |
| 5,754,012 | A | 5/1998 | LoCascio |
| 5,818,172 | A | 10/1998 | Lee |
| 5,822,201 | A | 10/1998 | Kijima |
| 5,825,133 | A | 10/1998 | Conway |
| 5,828,156 | A | 10/1998 | Roberts |
| 5,882,201 | A | 3/1999 | Salem |
| 5,892,336 | A | 4/1999 | Lin et al. |
| 5,910,713 | A | 6/1999 | Nishi et al. |
| 5,912,812 | A | 6/1999 | Moriarty, Jr. |
| 5,914,842 | A | 6/1999 | Sievers |
| 5,923,129 | A | 7/1999 | Henry |
| 5,930,121 | A | 7/1999 | Henry |
| 5,930,126 | A | 7/1999 | Griffin et al. |
| 5,936,360 | A | 8/1999 | Kaneko |
| 6,002,210 | A | 12/1999 | Nilssen |
| 6,020,688 | A | 2/2000 | Moisin |
| 6,028,400 | A | 2/2000 | Pol |
| 6,037,720 | A | 3/2000 | Wong et al. |
| 6,038,149 | A | 3/2000 | Hiraoka et al. |
| 6,040,662 | A | 3/2000 | Asayama |
| 6,043,609 | A | 3/2000 | George et al. |
| 6,049,177 | A | 4/2000 | Felper |
| 6,072,282 | A | 6/2000 | Adamson |
| 6,104,146 | A | 8/2000 | Chou et al. |
| 6,108,215 | A | 8/2000 | Kates et al. |
| 6,114,814 | A | 9/2000 | Shannon et al. |
| 6,121,733 | A | 9/2000 | Nilssen |
| 6,127,785 | A | 10/2000 | Williams |
| 6,127,786 | A | 10/2000 | Moisin |
| 6,137,240 | A | 10/2000 | Bogdan |
| 6,150,772 | A | 11/2000 | Crane |
| 6,169,375 | B1 | 1/2001 | Moisin |
| 6,181,066 | B1 | 1/2001 | Adamson |
| 6,181,083 | B1 | 1/2001 | Moisin |
| 6,181,084 | B1 | 1/2001 | Lau |
| 6,181,553 | B1 | 1/2001 | Cipolla et al. |
| 6,198,234 | B1 | 3/2001 | Henry |
| 6,198,236 | B1 | 3/2001 | O'Neill |
| 6,198,238 | B1 | 3/2001 | Edelson |
| 6,215,256 | B1 | 4/2001 | Ju |
| 6,218,788 | B1 | 4/2001 | Chen et al. |
| 6,259,615 | B1 | 7/2001 | Lin |
| 6,281,636 | B1 | 8/2001 | Okutsu et al. |
| 6,281,638 | B1 | 8/2001 | Moisin |
| 6,307,765 | B1 | 10/2001 | Choi |
| 6,310,444 | B1 | 10/2001 | Chang |
| 6,316,881 | B1 | 11/2001 | Shannon et al. |
| 6,323,602 | B1 | 11/2001 | De Groot et al. |
| 8,320,329 | | 11/2001 | Wacyk |
| 6,344,699 | B1 | 2/2002 | Rimmer |
| 6,362,577 | B1 | 3/2002 | Ito et al. |
| 6,396,722 | B2 | 5/2002 | Lin |
| 6,417,631 | B1 | 7/2002 | Chen et al. |
| 6,420,839 | B1 | 7/2002 | Chiang et al. |
| 6,433,492 | B1 | 8/2002 | Buonauita |
| 6,441,943 | B1 | 8/2002 | Roberts et al. |
| 6,445,141 | B1 | 9/2002 | Kastner et al. |
| 6,459,215 | B1 | 10/2002 | Nerone et al. |
| 6,459,216 | B1 | 10/2002 | Tsai |
| 6,469,922 | B2 | 10/2002 | Choi |
| 6,472,827 | B1 | 10/2002 | Nilssen |
| 6,472,876 | B1 | 10/2002 | Notohamiprodjo |
| 6,486,618 | B1 | 11/2002 | Li |
| 6,494,587 | B1 | 12/2002 | Shaw et al. |
| 6,501,234 | B2 | 12/2002 | Lin et al. |
| 6,509,696 | B2 | 1/2003 | Bruning et al. |
| 6,515,427 | B2 | 2/2003 | Oura et al. |
| 6,515,881 | B2 | 2/2003 | Chou et al. |
| 6,522,558 | B2 | 2/2003 | Henry |
| 6,531,831 | B2 | 3/2003 | Chou et al. |
| 6,534,934 | B1 | 3/2003 | Lin et al. |
| 6,559,606 | B1 | 5/2003 | Chou et al. |
| 6,570,344 | B2 | 5/2003 | Lin |
| 6,628,093 | B2 | 9/2003 | Stevens |
| 6,633,138 | B2 | 10/2003 | Shannon et al. |
| 6,680,834 | B2 | 1/2004 | Williams |
| 6,864,867 | B2 | 3/2004 | Biebl |
| 6,717,371 | B2 * | 4/2004 | Klier et al. ................. 315/274 |
| 6,717,372 | B2 | 4/2004 | Lin |
| 6,765,354 | B2 | 7/2004 | Klien |
| 6,781,325 | B2 | 8/2004 | Lee |
| 6,784,627 | B2 | 8/2004 | Suzuki et al. |
| 6,804,129 | B2 | 10/2004 | Lin |
| 6,870,330 | B2 | 3/2005 | Choi |
| 6,922,023 | B2 | 7/2005 | Hsu et al. |
| 6,930,893 | B2 | 8/2005 | Vinciarelli |
| 6,936,975 | B2 | 8/2005 | Lin et al. |
| 2001/0036096 | A1 | 11/2001 | Lin |

| | | | |
|---|---|---|---|
| 2002/0030451 | A1 | 3/2002 | Moisin |
| 2002/0097004 | A1 | 7/2002 | Chiang et al. |
| 2002/0135319 | A1 | 9/2002 | Bruning et al. |
| 2002/0140538 | A1 | 10/2002 | Yer |
| 2002/0145886 | A1 | 10/2002 | Stevens |
| 2002/0171376 | A1 | 11/2002 | Rust et al. |
| 2002/0180380 | A1 | 12/2002 | Lin |
| 2002/0180572 | A1 | 12/2002 | Kakehashi et al. |
| 2002/0181260 | A1 | 12/2002 | Chou et al. |
| 2002/0195971 | A1 | 12/2002 | Qian et al. |
| 2003/0001524 | A1 | 1/2003 | Lin et al. |
| 2003/0080695 | A1 | 5/2003 | Ohsawa |
| 2003/0090913 | A1 | 5/2003 | Che-Chen et al. |
| 2003/0117084 | A1 | 6/2003 | Stack |
| 2003/0141852 | A1 | 7/2003 | Yu |
| 2004/0032223 | A1 | 2/2004 | Henry |
| 2004/0155596 | A1 | 8/2004 | Ushijima |
| 2004/0257003 | A1 | 12/2004 | Hsieh et al. |
| 2004/0263092 | A1 | 12/2004 | Liu |
| 2005/0093471 | A1 | 5/2005 | Jin |
| 2005/0093472 | A1 | 5/2005 | Jin |
| 2005/0093482 | A1 | 5/2005 | Ball |
| 2005/0093483 | A1 | 5/2005 | Ball |
| 2005/0093484 | A1 | 5/2005 | Ball |
| 2005/0094372 | A1 | 5/2005 | Jin |
| 2005/0099143 | A1 | 5/2005 | Kohno |
| 2005/0156539 | A1 | 7/2005 | Ball |
| 2005/0162098 | A1 | 7/2005 | Ball |
| 2005/0225261 | A1 | 10/2005 | Jin |
| 2006/0022612 | A1 | 2/2006 | Henry |

FOREIGN PATENT DOCUMENTS

| | | |
|---|---|---|
| TW | 554643 | 9/2003 |
| WO | WO 94/15444 | 7/1994 |

OTHER PUBLICATIONS

Williams, B.W.; “Power Electronics Devices, Drivers, Applications and Passive Components”; Second Edition, McGraw-Hill, 1992; Chapter 10, pp. 218-249.

Bradley, D.A., “Power Electronics” 2nd Edition; Chapman & Hall, 1995; Chapter 1, pp. 1-38.

Dubey, G. K. “Thyristorised Power Controllers”; Halsted Press, 1986; pp. 74-77.

* cited by examiner

SYSTEMS AND METHODS FOR A TRANSFORMER CONFIGURATION WITH A TREE TOPOLOGY FOR CURRENT BALANCING IN GAS DISCHARGE LAMPS

RELATED APPLICATION

This application claims the benefit under 35 U.S.C. § 119(e) of U.S. Provisional Application No. 60/512,974, filed Oct. 21, 2003, the entirety of which is hereby incorporated by reference.

This application is related to copending application titled "Systems And Methods For A Transformer Configuration For Driving Gas Discharge Tubes In Parallel," Ser. No. 10/970,244 filed Oct. 20, 2004, which is now U.S. Pat. No. 7,141,933, and to copending application titled "Systems And Methods For Fault Protection In A Balancing Transformer," Ser. No. 10/970,248, filed Oct. 20, 2004, both filed on the same date as the present application, the entireties of which are hereby incorporated by reference.

BACKGROUND

1. Field of the Invention

The invention generally relates to balancing electrical current in loads with a negative impedance characteristic. In particular, the invention relates to balancing electrical current used in driving multiple gas discharge tubes, such as multiple cold cathode fluorescent lamps (CCFLs).

2. Description of the Related Art

Cold cathode fluorescent lamps (CCFLs) are used in a broad variety of applications as light sources. For example, CCFLs can be found in lamps, in scanners, in backlights for displays, such as liquid crystal displays (LCDs), and the like. In recent years, the size of LCD displays has grown to relatively large proportions. Relatively large LCDs are relatively common in computer monitors applications, in flat-screen televisions, and in high-definition televisions. In these and many other applications, the use of multiple CCFLS is common. For example, six CCFLs is relatively common in a backlight for a desktop LCD computer monitor. In another example of a relatively-large flat-screen television, 16, 32, and 40 CCFLs have been used. Of course, the number of CCFLs used in any particular application can vary in a very broad range.

Desirably, in applications with multiple CCFLs, the CCFLs are driven by relatively few power inverters to save size, weight, and cost. However, driving multiple CCFLs from a single or relatively few power inverters is a relatively difficult task. When multiple CCFLs are coupled in series, the operating voltage required to light the series-coupled lamps increases to impractical levels. The increase in operating voltage leads to increased corona discharge, requires expensive high voltage insulation, and the like.

Coupling CCFLs in parallel provides other problems. While the operating voltage of paralleled lamps is desirably low, relatively even current balancing in paralleled CCFLs can be difficult to achieve in practice. CCFLs and other gas discharge tubes exhibit a negative impedance characteristic in that the hotter and brighter a particular CCFL tube runs, the lower its impedance characteristic and the higher its drawn current. As a result, when CCFLs are paralleled without balancing circuits, some lamps will typically be much brighter than other lamps. In many cases, some lamps will be on, while other lamps will be off. In addition to the drawbacks of uneven illumination, the relatively brighter lamps can overheat and exhibit a short life.

A two-way balancing transformer can be used to balance current in two CCFLs. This type of balancing transformer can be constructed from two relatively equal windings on the same core and is sometimes referred to in the art as a "balun" transformer, though it will be understood that the term "balun" applies to other types of transformers as well. While the two-way balancing transformer technique works well to balance current when both CCFLs are operating, when one of the two CCFLs fails, the differential voltage across the two-way balancing transformer can grow to very high levels. This differential voltage can damage conventional two-way balancing transformers. In addition, conventional configurations with two-way balancing transformers are limited to paralleling two CCFLs. Another drawback of conventional balancing transformer configurations is relatively inefficient suppression of electromagnetic interference (EMI).

SUMMARY

Embodiments advantageously include balancing transformer configurations that are relatively cost-effective, reliable, and efficient. Embodiments include configurations that are applicable to any number of gas discharge tubes, such as cold cathode fluorescent lamps. The balancing transformer configuration techniques permit a relatively small number of power inverters, such as one power inverter, to power multiple lamps in parallel. Traditionally, driving multiple lamps has been difficult due to the negative impedance characteristic of such loads.

One embodiment of a two-way balancing transformer includes a safety winding which can be used to protect the balancing transformer in the event of a lamp failure and can be used to provide an indication of a failed lamp.

Embodiments include balancing transformer configurations that apply a balanced number of balancing transformer windings to the CCFLs, thereby further enhancing the balancing of the current by matching leakage inductance relatively closely.

Embodiments include "split" or "distributed" balancing transformer configurations that provide balancing transformers at both ends of CCFLs, thereby providing the filtering benefits of the leakage inductance of the balancing transformers to both ends of the CCFLs, which advantageously suppresses electromagnetic interference (EMI).

One embodiment is a two-way balancing transformer assembly for balancing a first current and a second current, where the two-way balancing transformer assembly includes: a core; a first balancing winding having about a first number of turns around the core, where the first balancing winding is configured to carry the first current; a second balancing winding having approximately the first number of turns around the core, where the second balancing winding is configured to carry the second current; and a safety winding with a second number of turns around the core, wherein the second number of turns is smaller than the first number of turns.

One embodiment is a method of limiting voltage in a two-way balancing transformer, where the method includes: providing a first balancing winding and a second balancing winding in the two-way balancing transformer to balance a first current and a second current, where the first balancing winding and the second balancing winding have at least approximately the same number of turns; providing a safety winding with fewer turns than the first balancing winding; and electrically coupling the safety winding to a circuit that clamps voltage to limit voltage in all the windings of the two-way balancing transformer, wherein a winding ratio between the first balancing winding and the safety winding steps down the voltage in the safety winding so that the circuit does not clamp voltage when the first current and the second current are substantially balanced.

One embodiment is a two-way balancing transformer assembly including: balancing windings intended to balance a first current and a second current; and means for limiting voltage in the balancing windings due to an imbalance in the first current and the second current.

One embodiment is a lamp assembly including: a plurality of at least 4 lamps, where the lamps each have a first end and a second end; a first terminal and a second terminal for receiving power from a secondary winding of an inverter transformer for driving the plurality of lamps in parallel, wherein a first terminal is operatively coupled to first ends of the lamps; and a straight tree of two-way balancing transformers with at least 2 levels in the tree, wherein at least one of the two-way balancing transformers includes a safety winding electrically coupled to anti-parallel diodes, wherein the straight tree includes a first two-way balancing transformer, a second two-way balancing transformer, and a third two-way balancing transformer, wherein: the first balancing transformer is operatively coupled to the second terminal, where the first two-way balancing transformer is operatively coupled to and is configured to balance current between the second two-way balancing transformer and the third balancing transformer; the second two-way balancing transformer is operatively coupled to second ends of at least a first lamp and a second lamp and balances current for the same; and the third two-way balancing transformer is operatively coupled to second ends of a third lamp and a fourth lamp and balances current for the same.

One embodiment is a method of paralleling lamps in a balanced manner, where the method includes: providing a plurality of at least 4 lamps; arranging at least 3 two-way balancing transformers in a hierarchical arrangement, wherein the hierarchical arrangement divides current in a balanced manner from a single current path to two current paths, and then from the two current paths to at least four current paths, wherein at least 1 of the at least 3 two-way balancing transformers incorporates a safety winding; operatively coupling the at least four current paths to the at least 4 lamps to parallel the lamps; and electrically coupling the safety winding to anti-parallel diodes.

One embodiment is a lamp assembly including: a plurality of at least 4 lamps; means for arranging two-way balancing transformers in a straight tree, where the straight tree of two-way balancing transformer is operatively coupled to the plurality of at least 4 lamps to divide current evenly among the lamps; and means for limiting voltage in the two-way balancing transformers with safety windings.

One embodiment is an assembly of negative-impedance gas-discharge lamp loads including: a plurality of at least 4 lamp loads, where the lamp loads each have a first end and a second end; a first terminal and a second terminal for receiving power from a secondary winding of an inverter transformer for driving the plurality of lamp loads in parallel; and a split tree of two-way balancing transformers with at least 2 levels in the tree, where a first level is operatively coupled to first ends of the lamp loads and a second level is operatively coupled to the second ends of the lamp loads, where the first level is operatively coupled to the first terminal and the second level is operatively coupled to the second terminal.

One embodiment is a method of paralleling negative-impedance gas-discharge lamp loads in a balanced manner, where the method includes: providing a plurality of at least 4 lamp loads; arranging at least 3 two-way balancing transformers in a split tree, wherein the split tree arrangement divides current in a balanced manner from at least a single current path to four current paths, wherein the split tree arrangement provides at least one two-way balancing transformer at both ends of the lamp loads; and operatively coupling the at least four current paths to the at least 4 lamp loads to parallel the lamp loads.

One embodiment is an assembly of negative-impedance gas-discharge lamp loads including: a plurality of at least 4 lamp loads; and means for splitting two-way balancing transformers between both ends of the lamp loads to divide current evenly among the lamp loads in a hierarchical configuration.

One embodiment is an assembly of negative-impedance gas-discharge lamp loads including: a plurality of at least 4 lamp loads, where the lamp loads each have a first end and a second end; a first terminal and a second terminal for receiving power from an inverter transformer for driving the plurality of lamp loads in parallel; and a partially split tree of two-way balancing transformers, wherein the partially split tree is coupled to the plurality of at least 4 lamp loads and to the first terminal and the second terminal, wherein at least a first two-way balancing transformer of the partially split tree is operatively coupled to first ends of corresponding lamp loads and at least a second two-way balancing transformer is operatively coupled to second ends of corresponding lamp loads, and where a third two-way balancing transformer is operatively coupled to the first two-way balancing transformer or the second two-way balancing transformer.

One embodiment is method of paralleling negative-impedance gas-discharge lamp loads in a balanced manner, where the method includes: providing a plurality of at least 4 lamp loads with first ends and second ends; arranging at least 3 two-way balancing transformers in a partially split tree, wherein the partially split tree arrangement divides current in a balanced manner from a single current path to at least four current paths, wherein at least one two-way balancing transformer is operatively coupled to first ends of two or more lamp loads and at least another two-way balancing transformer is operatively coupled to second ends of another two or more lamp loads; and operatively coupling the at least four current paths to the at least 4 lamp loads to parallel the lamp loads.

One embodiment is an assembly of negative-impedance gas-discharge lamp loads including: a plurality of at least 4 lamp loads; and means for arranging two-way balancing transformers in a partially split tree, where the partially split tree of two-way balancing transformer is operatively coupled to the plurality of at least 4 lamp loads to divide current evenly among the lamp loads.

One embodiment is an assembly of negative-impedance gas-discharge lamp loads including: a plurality of lamp loads, where the lamp loads each have a first end and a second end; a first terminal and a second terminal for receiving power from at least one inverter transformer for driving the plurality of lamp loads in parallel; a first plurality of balancing transformers operatively coupled between the first end of the plurality of lamp loads and the first terminal; and a second plurality of balancing transformers operatively coupled between the second end of the plurality of lamp loads and the second terminal.

One embodiment is a negative-impedance gas-discharge lamp load assembly including: a plurality of at least 4 lamp loads, where the lamp loads each have a first end and a second end; a first terminal and a second terminal for receiving power from a secondary winding of an inverter transformer for driving the plurality of lamp loads in parallel, wherein a first terminal is operatively coupled to first ends of the lamp loads; and a straight tree of a two-way balancing transformer in a first level and first and second groups of ring balancing transformers in a second level: where the two-way balancing transformer is operatively coupled to the second terminal and is configured to balance current between the first and second rings of ring balancing transformers; where the first group of ring balancing transformers are individually operatively coupled to second ends of at least a first lamp load and a second lamp load and balance currents for the same; and where the second group of ring balancing transformers are individually operatively coupled to second ends of a third lamp load and a fourth lamp load and balance currents for the same.

One embodiment is a method of paralleling negative-impedance gas-discharge lamps in a balanced manner, where the method includes: providing a plurality of at least 4 lamp loads; arranging at least one two-way balancing transformer and a plurality of ring transformers in a straight hierarchical; using the two-way balancing transformer to divide a single current path into two balanced current paths; and using separate sets of ring transformers to balance currents among parallel lamp loads in each of the balanced current paths.

One embodiment is an assembly of negative-impedance gas-discharge lamp loads including: a plurality of at least 4 lamp loads, where the lamp loads each have a first end and a second end; a first terminal and a second terminal for receiving power from an inverter for driving the plurality of lamp loads in a parallel configuration; and a hybrid split tree with at least two levels, where a first level includes at least one two-way balancing transformer and a second level includes a plurality of ring balancing transformers, where at least one of the first level or the second level level is operatively coupled to first ends of the lamp loads and the other of the first level or the second level is operatively coupled to the second ends of the lamp loads, where the first level is operatively coupled to the first terminal and the second level is operatively coupled to the second terminal.

One embodiment is method of paralleling negative-impedance gas-discharge lamp loads in a balanced manner, where the method comprises: providing a plurality of at least 4 lamp loads; arranging at least one two-way balancing transformer and a plurality of ring balancing transformers in a hybrid split tree; using the two-way balancing transformer to divide a single current path into two balanced current paths; using the ring transformers to provide current sharing among multiple parallel branches of each balanced current path; and operatively coupling multiple parallel branches to the at least 4 lamp loads to parallel the lamp loads.

One embodiment is a lamp assembly including: at least one two-way balancing transformer operatively coupled to a single current path and configured to split current carried by the single current path into multiple balanced sets of current paths in a hierarchical manner, wherein the single current path is also operatively coupled to a first output terminal of an inverter transformer; at least a first group and a second group of ring balancing transformers; a first group of lamps operatively coupled between a first set of the multiple current paths and the first group of ring balancing transformers, wherein the first group of ring balancing transformers is also operatively coupled to a second output terminal of the inverter transformer and is configured to provide current sharing among the first group of lamps; and a second group of lamps operatively coupled between the second group of ring balancing transformers and the second output terminal of the inverter transformer, wherein the second group of ring balancing transformers is also operatively coupled to a second set of multiple current paths and is configured to provide current sharing among the second group of lamps.

One embodiment is a method of paralleling negative-impedance gas-discharge lamp loads in a balanced manner, where the method includes: providing a plurality of at least 4 lamp loads with first ends and second ends; arranging at least a two-way balancing transformer and a plurality of ring transformers in a partially split tree; using the two-way balancing transformer to divide a single current path into two balanced current paths; using the ring transformers to divide the two balanced current paths to at least four balanced current paths; and operatively coupling the at least four current paths to the at least 4 lamp loads to parallel the lamp loads.

One embodiment is an assembly of negative-impedance gas-discharge lamp loads including: a plurality of at least 4 lamp loads; and a hybrid tree with a plurality of two-way balancing transformers separately coupled to pairs of lamp loads to balance current within the respective pairs of lamp loads and a set of ring balancing transformers to balance current among the pairs of lamp loads.

One embodiment is a method of paralleling negative-impedance gas-discharge lamp loads in a balanced manner, where the method includes: providing a plurality of at least 4 lamp loads; arranging at least one group of ring balancing transformers and a plurality of two-way balancing transformers in a hybrid split tree; using the ring transformers maintain balanced currents among multiple pairs of lamp loads; and using the two-way balancing transformers to balance currents within each pair of lamp loads.

One embodiment is an assembly of negative-impedance gas-discharge lamp loads including: a plurality of at least 4 lamp loads; and means for arranging at least one two-way balancing transformer and a plurality of "ring" balancing transformers in a hybrid tree operatively coupled to the plurality of at least 4 lamp loads to divide current evenly among the lamp loads.

BRIEF DESCRIPTION OF THE DRAWINGS

These drawings (not to scale) and the associated description herein are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

Embodiments advantageously include balancing transformer configurations that are relatively cost-effective, reliable, efficient, and good performing. Embodiments include configurations that are applicable to any number of gas discharge tubes, such as cold cathode fluorescent lamps. The balancing transformer configuration techniques permit a relatively small number of power inverters, such as one power inverter, to power multiple lamps in parallel. Traditionally, driving multiple lamps has been difficult due to the negative impedance characteristic of such loads. The balancing techniques disclosed herein advantageously permit paralleled lamps to "start" or light up relatively quickly and maintain relatively well-balanced current during operation.

While illustrated and described in connection with cold-cathode fluorescent lamps, the skilled artisan will appreciate that the principles and advantages disclosed herein will be applicable to other negative-impedance gas discharge loads.

Two-Way Balancing Transformer Configurations

Figure 1:
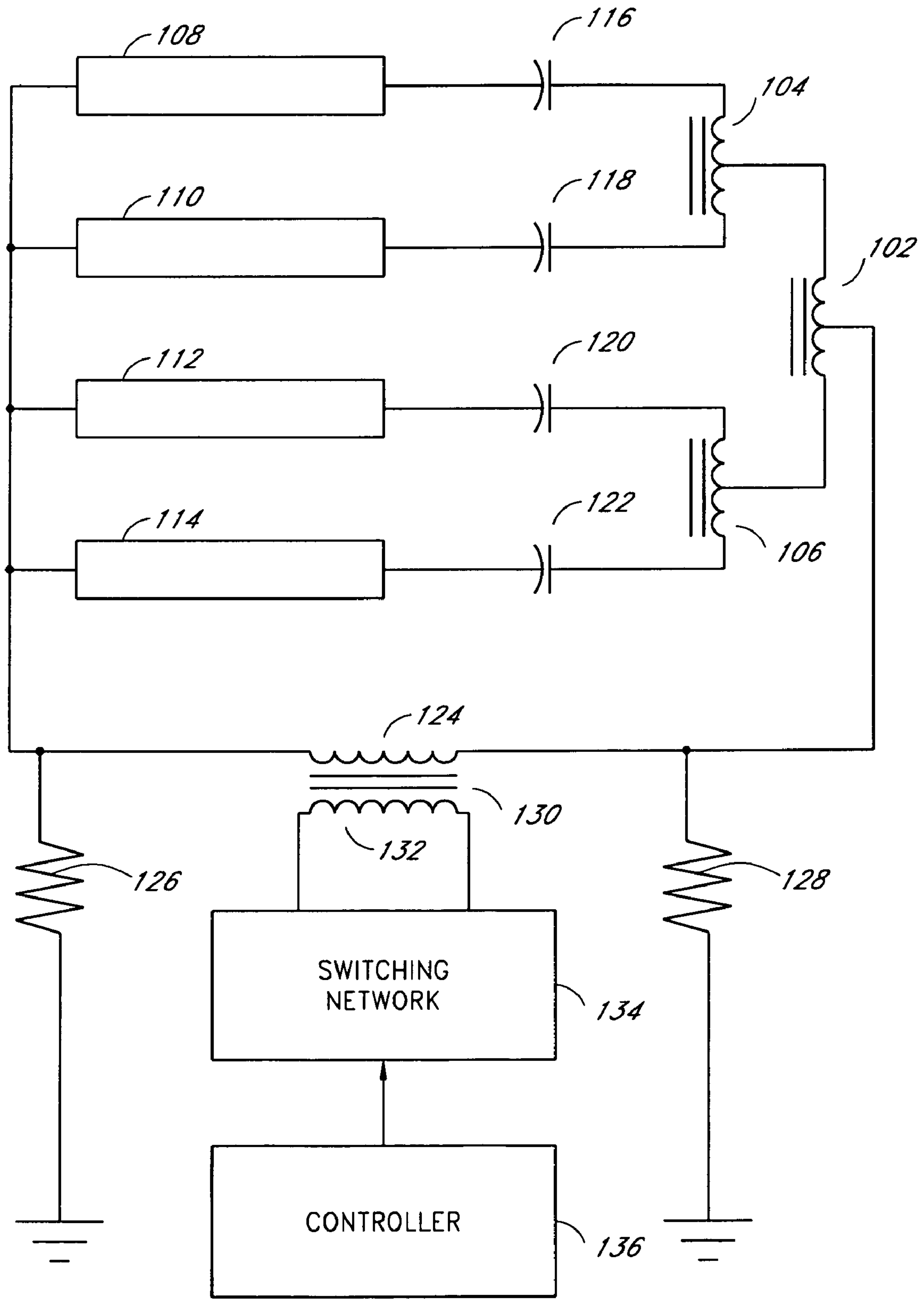
FIG. 1 illustrates a configuration of two-way balancing transformers and cold cathode fluorescent lamps (CCFLs) arranged in a floating "straight" tree.

FIG. 1 illustrates a configuration of two-way balancing transformers and cold cathode fluorescent lamps (CCFLs) arranged in a floating "straight" tree. Although illustrated in the context of a two-level tree or hierarchy with 4 CCFLs, it will be understood by one of ordinary skill in the art that the tree can be extended to N-levels with $2^N$ CCFLs, such as to 3 levels with 8 CCFLs, to 4 levels with 16 CCFLs, and so forth. One disadvantage of a straight "tree" configuration with two-way balancing transformers is that the tree provides balancing for numbers of CCFLs that are powers of 2.

A first two-way balancing transformer 102 in a first level of the tree balances current for a second layer of the tree, which includes a second two-way balancing transformer 104 and a third two-way balancing transformer 106. The second two-way balancing transformer 104 is operatively coupled to first ends of a first CCFL 108 and a second CCFL 110 and advantageously balances current for the same. The third two-way balancing transformer 106 is operatively coupled to first ends of a third CCFL 112 and a fourth CCFL 114 and also balances current for the same. In one embodiment, the two-way balancing transformers do not use bifilar windings and rather, use bobbins that separate the windings as described later in connection with FIGS. 3 and 4. In one embodiment, the two-way balancing transformers used in the illustrated configuration also include a separate "safety" winding as will be described later in connection with FIGS. 2 and 5–10. In another embodiment, the two-way balancing transformers include a separate safety winding and are not bifilar wound.

It will be observed that capacitors 116, 118, 120, 122 are present in series with the CCFLs. These capacitors are optional and can enhance CCFL life by ensuring that direct current (DC) is not applied to the CCFLs. These capacitors can be disposed in the current path at either end of a CCFL and even further upstream, such as between balancing transformers. In one embodiment, the capacitors are prewired to CCFLs in a backlight assembly. An example of a source of DC is a rectification circuit on the secondary side (the lamp side) used to estimate current in a CCFL. These rectification circuits are typically referenced to ground. Depending on the control chip, these rectification circuits can be used to provide feedback to the control chip as to an amount of current flowing through the lamps.

A secondary winding 124 of an inverter transformer 130 couples power across the first two-way balancing transformer 102 and second ends of the CCFLs to power the CCFLs. A primary winding 132 is electrically coupled to a switching network 134, which is controlled by a controller 136. Typically, the switching network 134 and the controller 136 are powered from a direct current (DC) power source, and the switching network 134 is controlled by driving signals from the controller 136, and the switching network 134 generates a power alternating current (AC) signal for the inverter transformer 130. The switching network 134 can correspond to a very broad range of circuits, such as, but not limited to, full bridge circuits, half-bridge circuits, push-pull circuits, Royer circuits, and the like.

In the illustrated embodiment, the inverter transformer 130 is relatively tightly coupled from the primary winding to the secondary winding 124, and the control chip regulates current flow for the CCFLs 108, 110, 112, 114 by monitoring primary-side current, rather than secondary-side current. This advantageously permits the secondary winding 124 to be floating with respect to ground as shown in the illustrated embodiment.

Another example of an inverter transformer configuration that can be used to provide a "floating" configuration will be described later in connection with FIG. 13, where two separate inverter transformers are used. It will be understood that a wide variety of inverter transformer configurations can be used to provide a floating configuration. In addition, as used herein, the term "inverter transformer" can apply to one or more inverter transformers.

This floating configuration advantageously permits a peak voltage differential between a component on the secondary side (the lamp side) and a backplane for a backlight, which is typically grounded, to be relatively lower, thereby reducing the possibility of corona discharge. In one embodiment, the floating configuration illustrated in FIG. 1 also optionally includes one or more relatively high-resistance value resistors 126, 128 to ground to discharge static charge.

The advantage of the floating configuration illustrated in FIG. 1 for reduced risk of corona discharge is shared with the floating configurations that will be described later in connection with FIGS. 13, 16, 19, 22, 25, and 28. In addition, one or more high-value resistors 126, 128 to ground are also optional in the other floating configurations. In one embodiment, a pair of equal-value resistors 126, 128 to ground are electrically coupled to opposing terminals of the secondary winding 124 to provide a high-resistance DC path to ground in a balanced manner. An example of an applicable value of resistance is 10 megaohms. This value is not critical and other values will be readily determined by one of ordinary skill in the art.

Balancing Transformer

Figure 2:
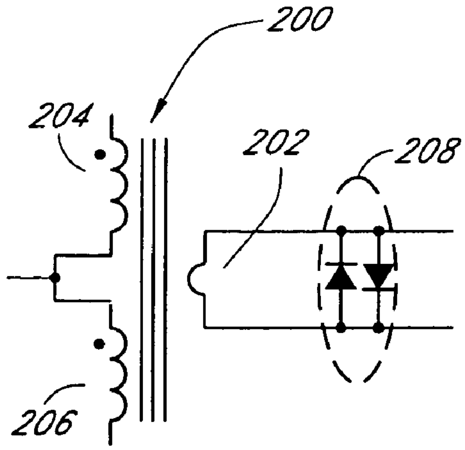
FIG. 2 illustrates an embodiment of a two-way balancing transformer with a safety winding.

FIG. 2 is a schematic diagram of an embodiment of a two-way balancing transformer 200 with a safety winding 202. The two-way balancing transformer 200 can be used by itself to balance current in two-lamp systems or can be combined with other transformers (with or without safety windings) in a multiple-level tree for balancing current in systems with more than 2 lamps, such as the multiple-level configurations with two-way balancing transformers described herein. For clarity, the configurations with two-way balancing transformers disclosed herein are not drawn with the presence of the optional safety winding 202.

The two-way balancing transformer 200 also includes a first balance winding 204 and a second balance winding 206 coupled as illustrated for balancing. In one embodiment, the magnetic polarity as indicated by the dots is opposite to the winding polarity of the first balance winding 204 and the second balance windings 206. The above advantage results from reversing a balancing transformer bobbin on the mandrel or reversing the mandrel rotation between winding of the first balance winding 204 and the second balance winding 206. In one embodiment, the first balance winding 204 and the second balance windings 206 have substantially the same number of turns (e.g., 250 turns) to provide equal current sharing.

In one embodiment, the safety winding 202 is realized with a single turn winding of conductive metal. It will be understood that the number of turns will vary depending on the turns ratio desired and can vary in a very large range.

As illustrated, the safety winding 202 is isolated from the other windings. For example, the safety winding 202 can be wound in its own section in a bobbin as will be described later in connection with FIGS. 5 and 6. In one embodiment, the safety winding 202 is wound from insulated wire, rather than the conventional coated magnetic wire or "mag wire." This advantageously permits the safety winding 202 to be coupled to a control circuit on a primary side of an inverter transformer to detect a relatively large mismatch between the currents which should otherwise be balanced by the balancing transformer 200. For example, when a lamp that is paralleled fails, this can cause a relatively large imbalance which induces a relatively large voltage in the safety winding 202. This voltage can be sensed by the control circuit and corrective measures, such as a reduction in current on the primary side so as not to overload the remaining lamps, an indication of a failure, a shut down of the power to the primary side, and the like, can be provided. Of course, it will be appreciated that upon immediate start up, the paralleled lamps may not start simultaneously. In one embodiment, the control circuit is configured to ignore imbalances for a predetermined time period at start up, such as a time period of about one-third of a second to about 3 seconds. It will be understood that this time period can vary in a very large range.

In one embodiment, the safety winding 202 is optionally further coupled to a pair of anti-parallel diodes 208 as diode limiters. For example, where one paralleled lamp is "on" and another is "off," the anti-parallel diodes 208 clamp the voltage at the safety winding 202, thereby clamping the voltage on the balancing windings 204, 206. This situation frequently occurs upon startup of paralleled CCFLs. Clamping of the voltage advantageously prevents damage to the balancing transformer 200 by limiting the maximum voltage across the balancing windings 204, 206 to a safe level. In one example, where a winding ratio is about 250:1 between a balancing winding and the safety winding 202, the anti-parallel diodes 208 clamp at about 0.9 volts (for relatively large amounts of current), and limit the voltage across a balancing winding to about 225 volts. For example, this advantageously permits thinner coatings to be used in the balancing windings 204, 206, thereby lowering cost and efficiently increasing an amount of area used by conductive material.

Balancing Transformer Bobbin

Figure 3:
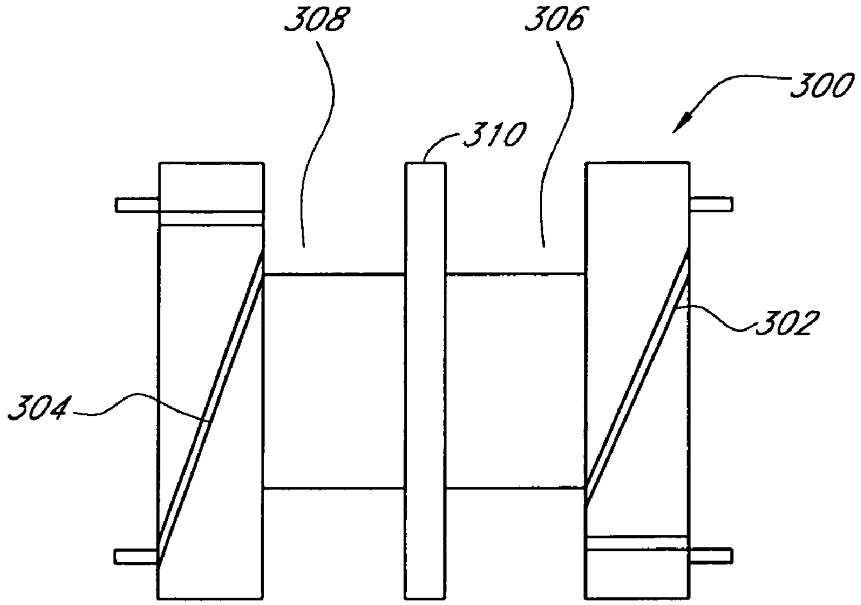
FIG. 3 is a bottom view and FIG. 4 is a side view of an embodiment of a bobbin for a two-way balancing transformer.
Figure 4:
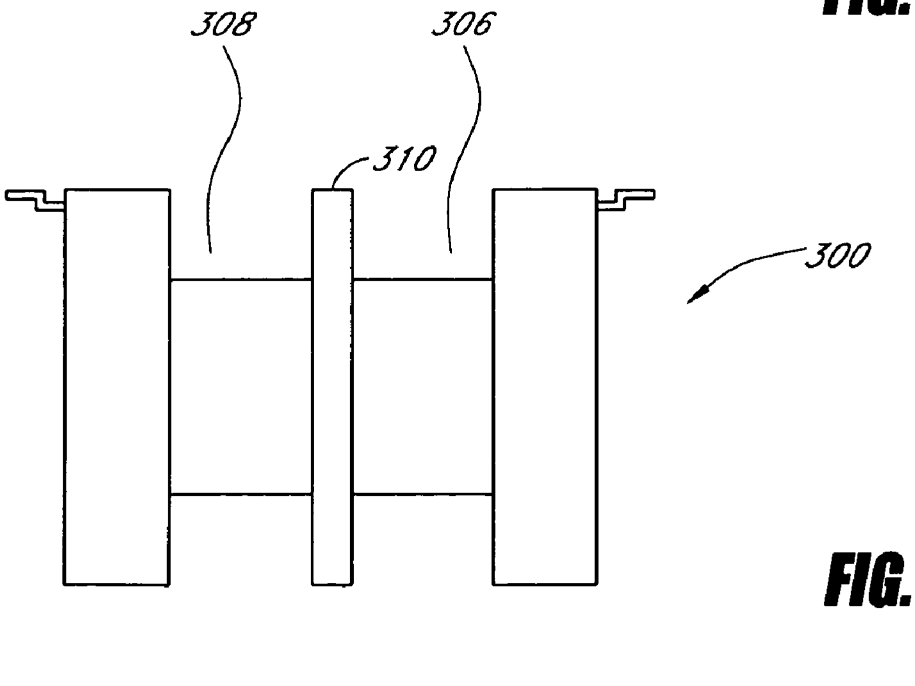

FIGS. 3 and 4 illustrate an example of a bobbin 300 that can be used for a two-way balancing transformer. FIG. 3 illustrates a bottom view and FIG. 4 illustrates a side view. An example of a bobbin with a separate section for a safety winding will be described later in connection with FIGS. 5 and 6. A bobbin should be formed from a non-conductive and a non-magnetic material. For example, a bobbin can be molded from a single piece of material such as a liquid crystal polymer (LCP) or another plastic.

In one embodiment, the high voltage ends (the ends electrically coupled to the lamps) are the winding starts of the respective balance windings of the balancing transformer. The winding starts are isolated on opposite ends of the illustrated balancing transformer bobbin 300 to provide increased creepage for the high voltage ends. Increased creepage reduces the possibility of arcing, especially during the starting of the lamps when the voltage at the high voltage ends are higher than the operating voltage.

In one embodiment, slanted slots 302, 304 on opposite ends of the balancing transformer bobbin 300 accommodate the winding starts. The slanted slots 302, 304 guide and insulate the winding starts from the rest of the balance windings and from the core of the transformer. In one embodiment, the slanted slots 302, 304 are relatively deep at the locations proximate to the respective balance windings and relatively shallow at the locations proximate to the respective pins.

The first and second balance windings of the balancing transformer are wound separately on opposite outer sections 306, 308 of the balancing transformer bobbin 300, i.e., not bifilar wound. One or more dividers 310 on the balancing transformer bobbin can be included to separate the balance windings. In one embodiment, to achieve the proper phase between the two balance windings, the rotation of the mandrel is reversed or the bobbin 300 on the mandrel is reversed between winding of the first balance winding and the second balance winding.

A safety winding can be used with the illustrated bobbin 300. A relatively small number of windings, such as a single-turn or a two-turn winding can be wound on the bobbin 300. An insulated conductor can be used for the safety winding to allow the safety winding to come into contact with the balance windings.

Bobbin with Safety Winding Section for a Two-Way Balancing Transformer

Figure 5:
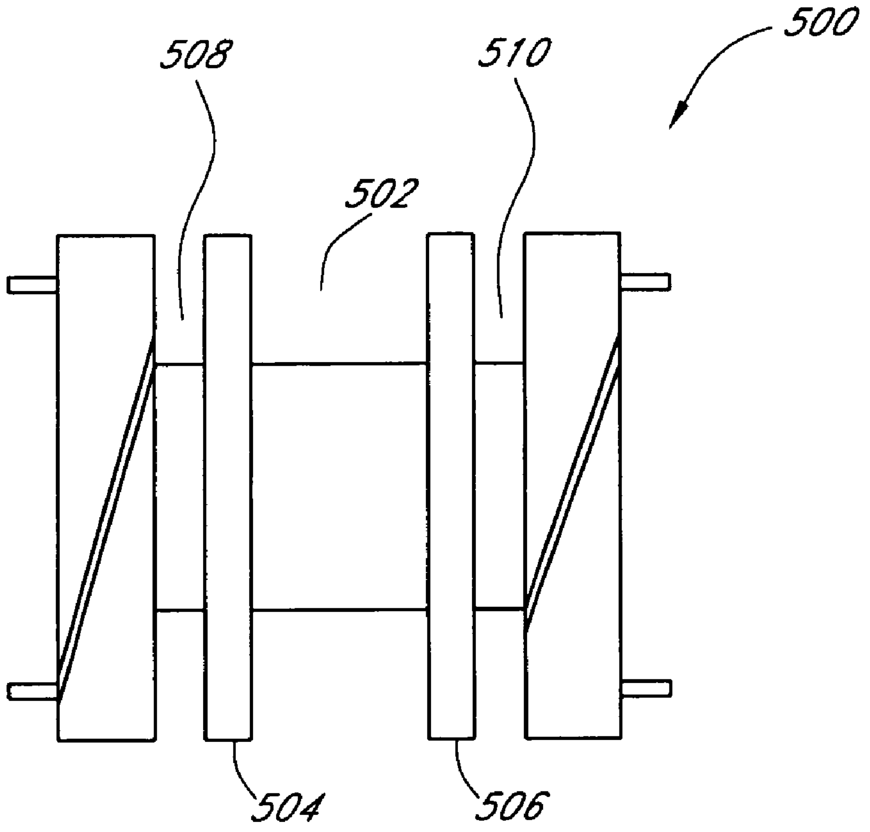
FIG. 5 is a bottom view and FIG. 6 is a side view of an embodiment of a bobbin for a two-way balancing transformer with a safety winding.
Figure 6:
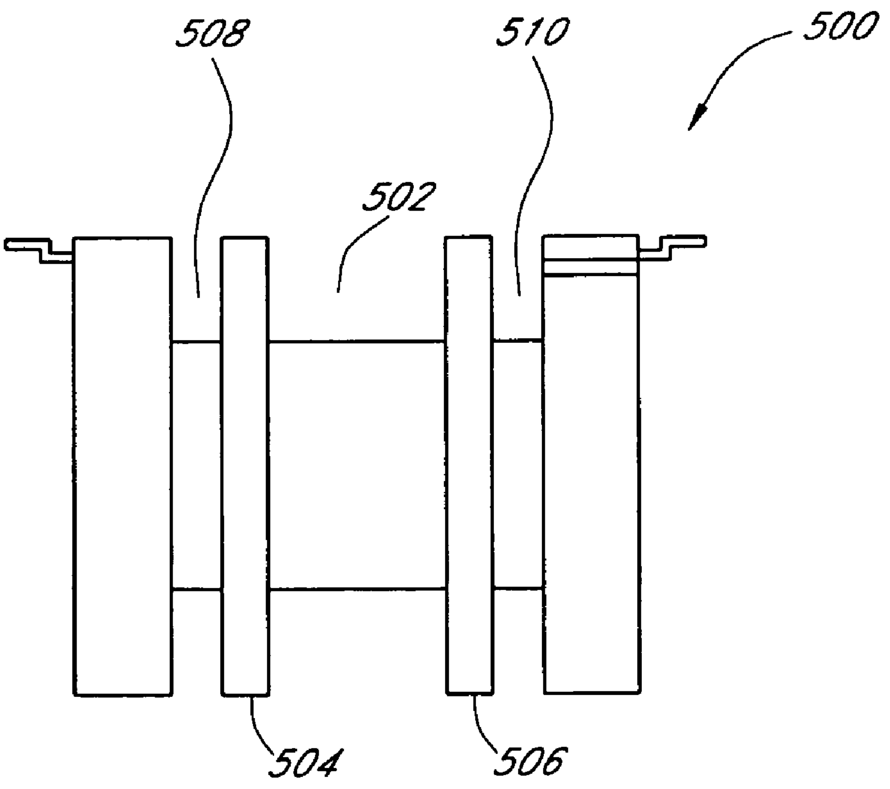

FIG. 5 illustrates a bottom view and FIG. 6 illustrates a side view of a balancing transformer bobbin 500 for a two-way balancing transformer with a safety winding. The illustrated bobbin 500 has a separate section for a safety winding. The safety winding protects the balancing transformer from excessive voltage from mismatches in current. For example, a relatively small number of windings, such as a single-turn or a two-turn winding can be wound on the balancing transformer bobbin 500.

Dividers 504, 506 isolate a center section 502 of the transformer bobbin 500 from the balance windings and permit a bare conductor to be used for the safety winding. For example, the safety winding can be realized with a single piece of conductive sheet metal (e.g., copper, brass or beryllium copper) mounted to an inner portion of the center section 502 on the balancing transformer bobbin with isolation dividers 504, 506 on either side. Of course, an insulated wire or a coated wire, such as a magnetic wire or "mag" wire can also be used. In the illustrated embodiment, the sections 508, 510 for the balancing windings have a different width than the center section 502. The safety winding is mounted in the center section 502. It will be understood that the bobbin can be modified in a variety of ways. In other embodiments, the ordering of the sections is changed, the sections can have the same width, and the like.

Figure 7:
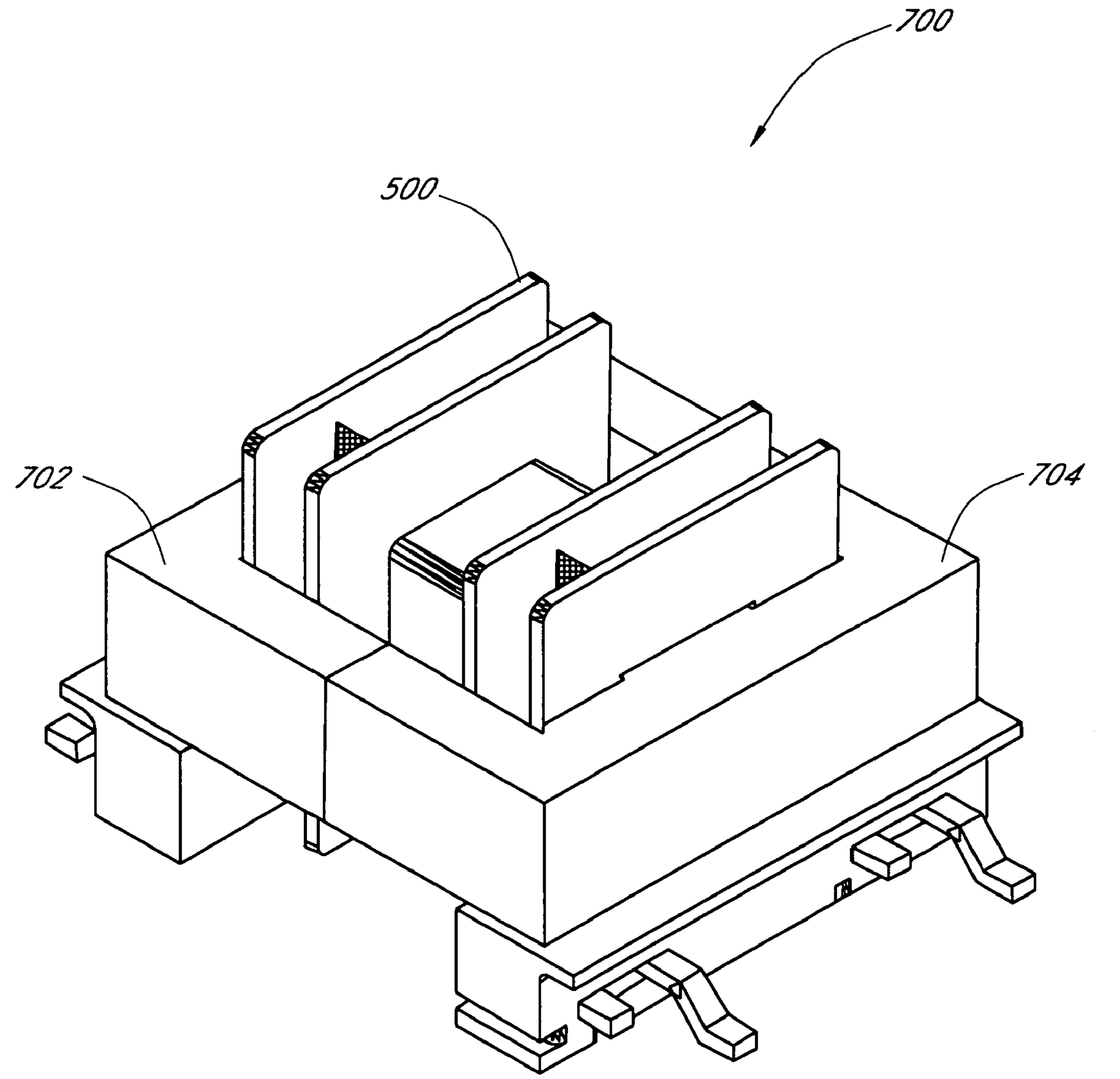
FIG. 7 is a perspective view of an embodiment of a two-way balancing transformer with a safety winding.
Figure 8:
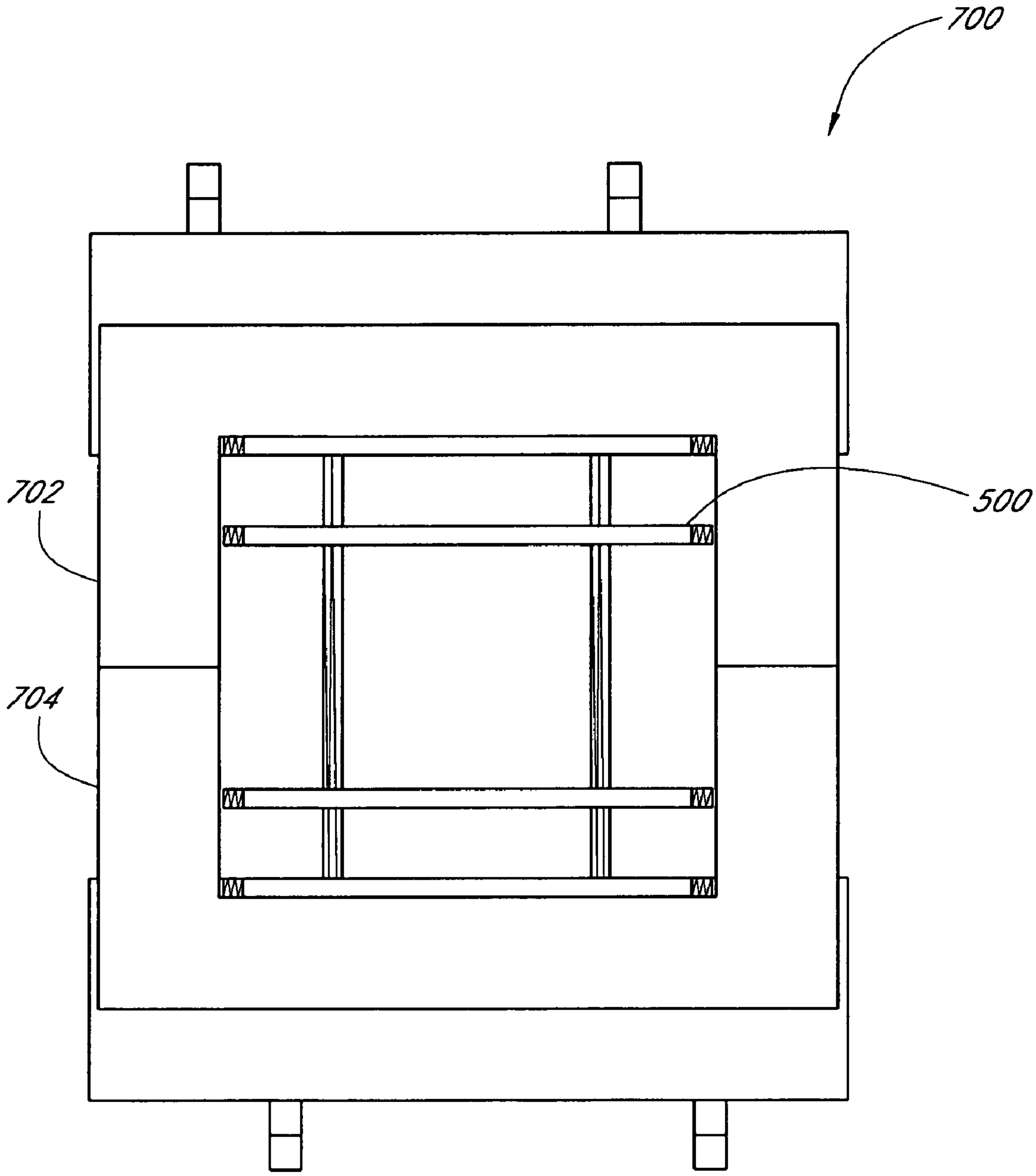
FIGS. 8, 9, and 10 are a top view, a front view, and a side view, respectively of the embodiment of FIG. 7.
Figure 9:
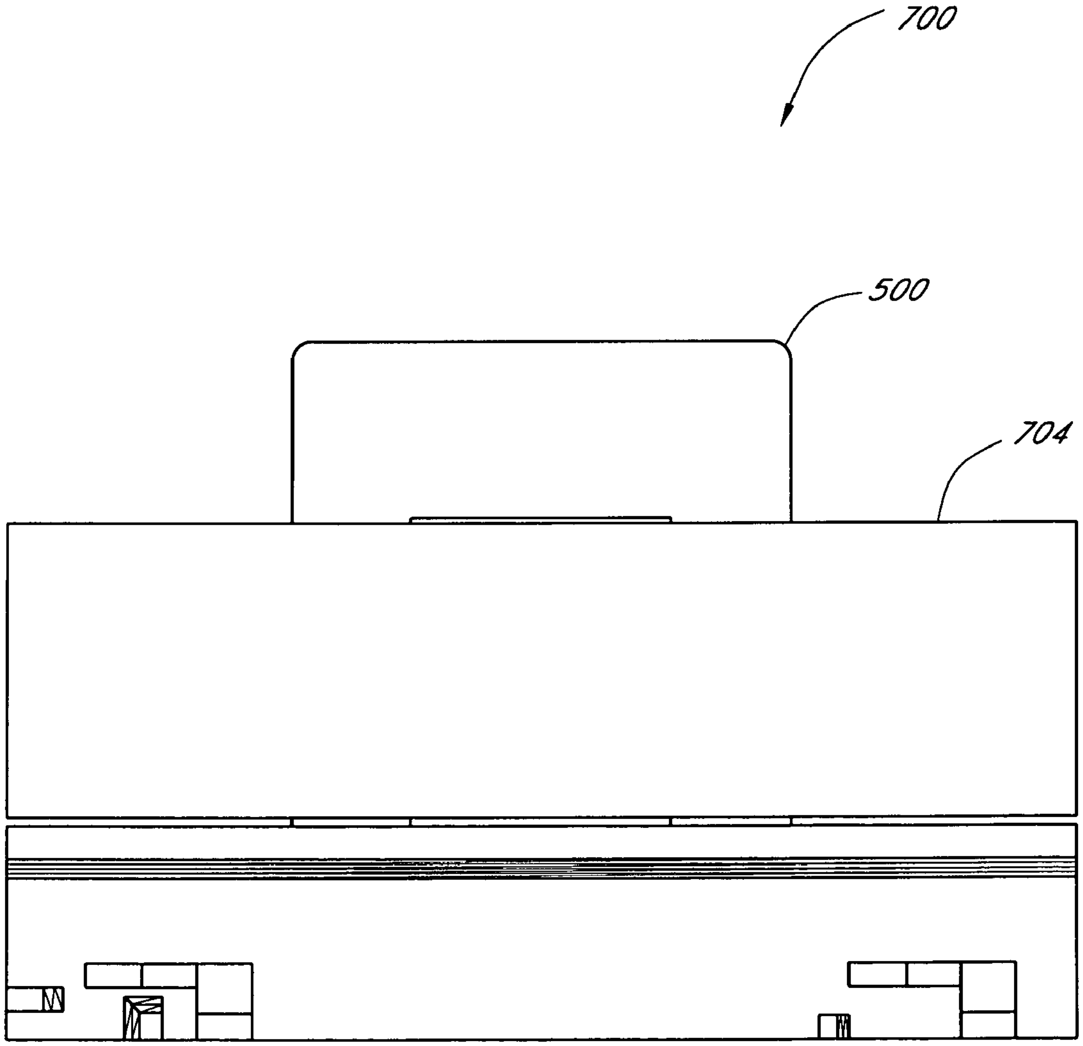
Figure 10:
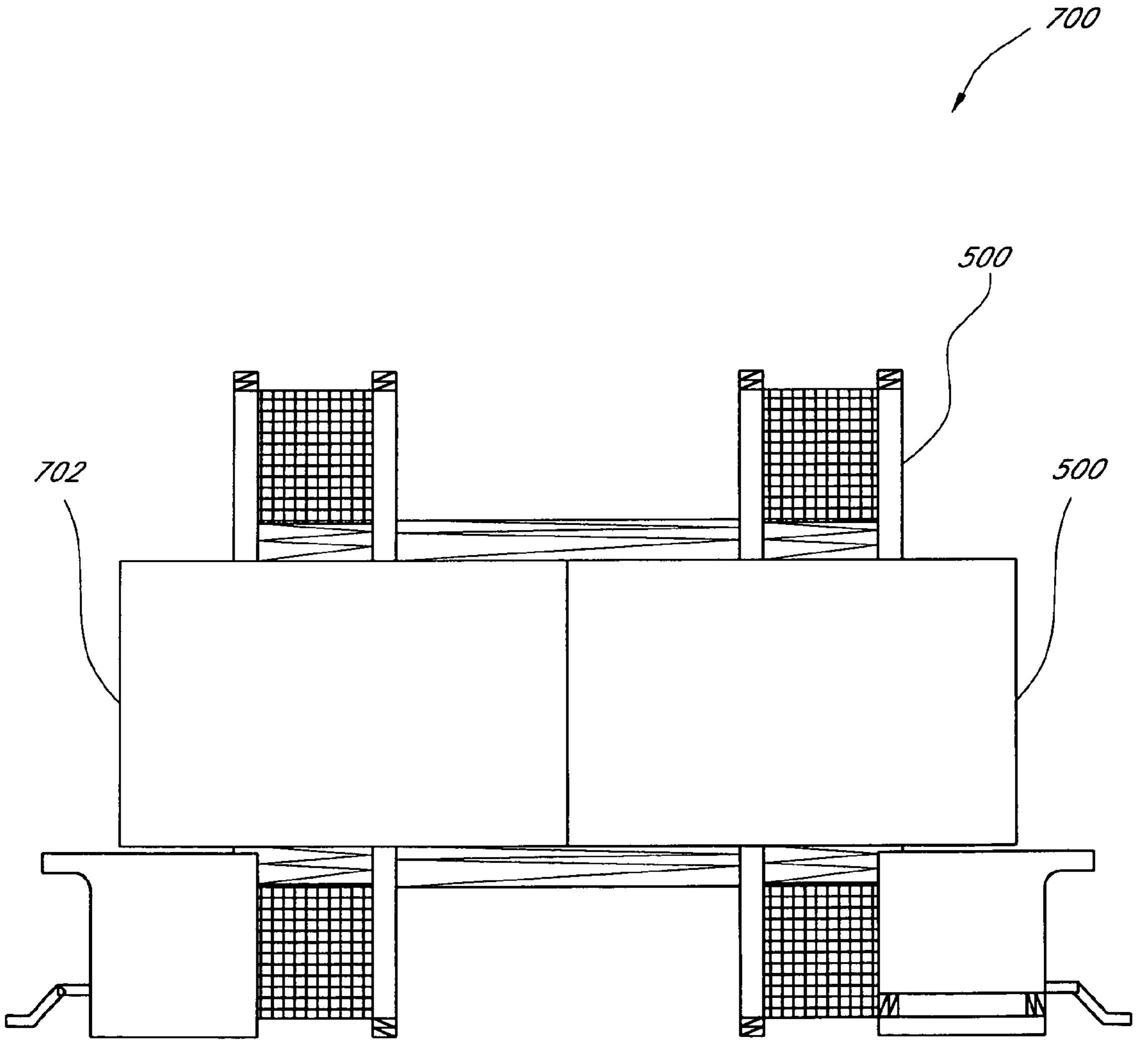

FIG. 7 is a perspective view of an embodiment of a two-way balancing transformer with a safety winding 700. The illustrated transformer 700 includes the bobbin 500 and a core. In the illustrated embodiment, two "E" cores 702, 704 are used to form the core. It will be understood that other cores can be used. FIGS. 8, 9, and 10 illustrate a top view, a front view, and a side view of the transformer 700, respectively.

Other Two-Way Balancing Transformer Configurations

Figure 11:
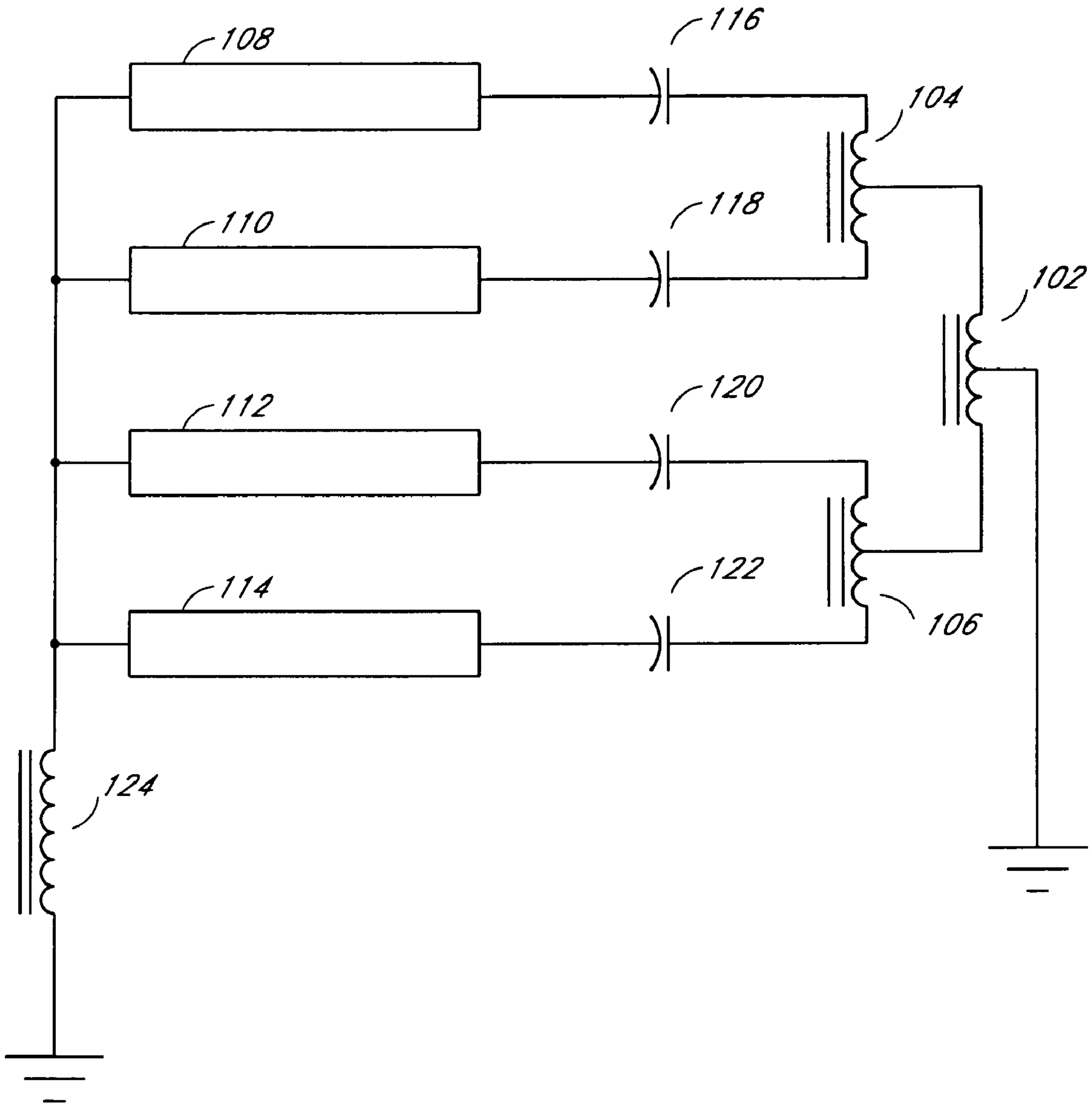
FIGS. 11–18 illustrate other configurations of two-way balancing transformers and CCFLs.

FIG. 11 illustrates a configuration of two-way balancing transformers and CCFLs arranged in a straight tree with the lamps operatively coupled to a "high" side of a secondary winding of an inverter transformer. Unlike the configuration described earlier in connection with FIG. 1, the configuration of FIG. 11 is not floating on the secondary-side (the lamp side) of the inverter transformer. Rather, an end of the secondary winding 124 is operatively coupled to ground and a "high" side of the secondary winding 124 is coupled to the lamps.

Figure 12:
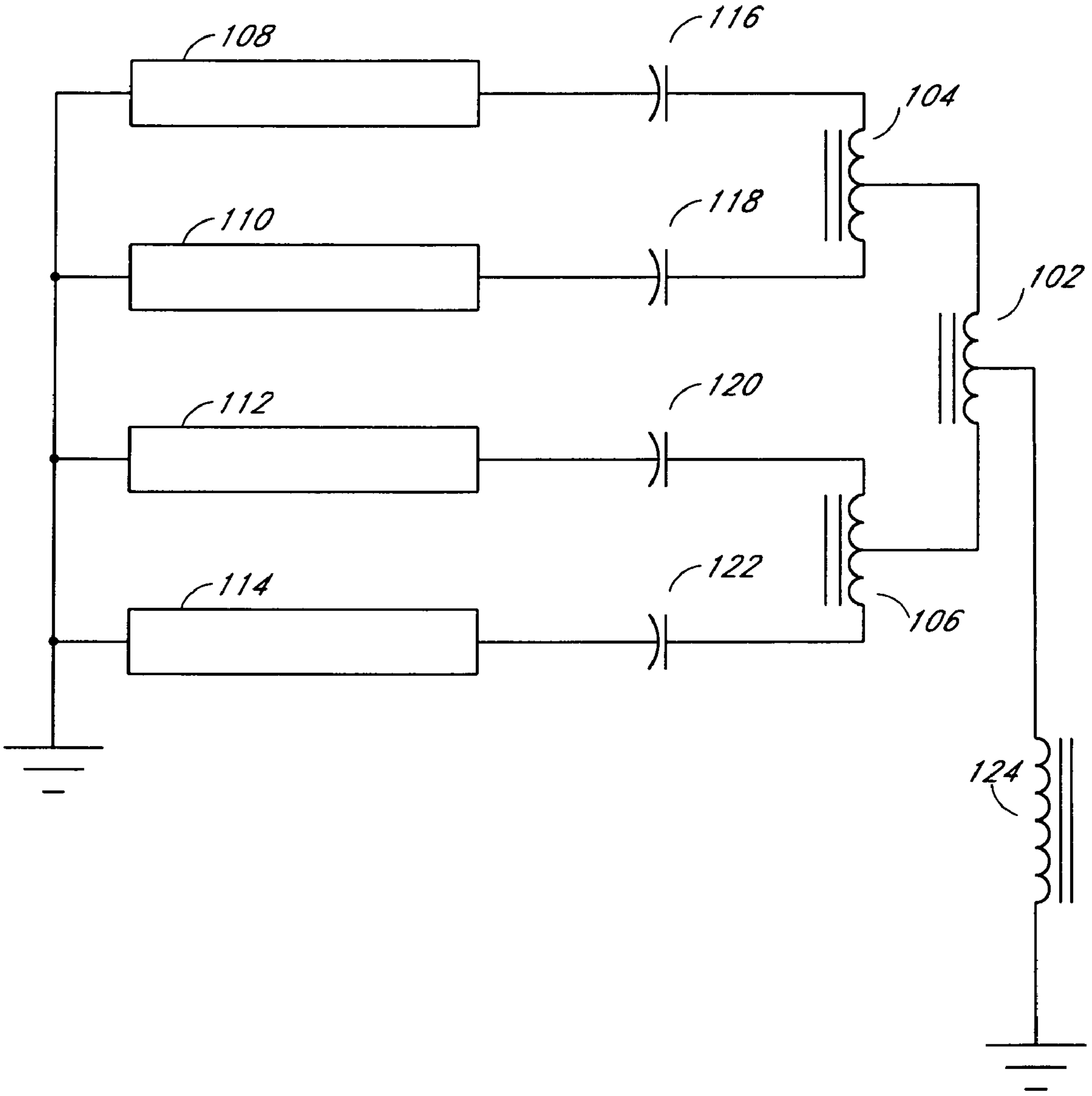

FIG. 12 illustrates a configuration of two-way balancing transformers and CCFLs arranged in a straight tree with a balancing transformer end operatively coupled to a "high" side of a secondary of an inverter transformer. The configurations illustrated in FIGS. 11 and 12 permit a control circuit for the inverter to regulate the current for the lamps by sensing the current on the secondary side. Disadvantageously, by coupling to ground, the "high" side of the secondary winding has a relatively high voltage with respect to a ground reference, such as a backplane.

Figure 13:
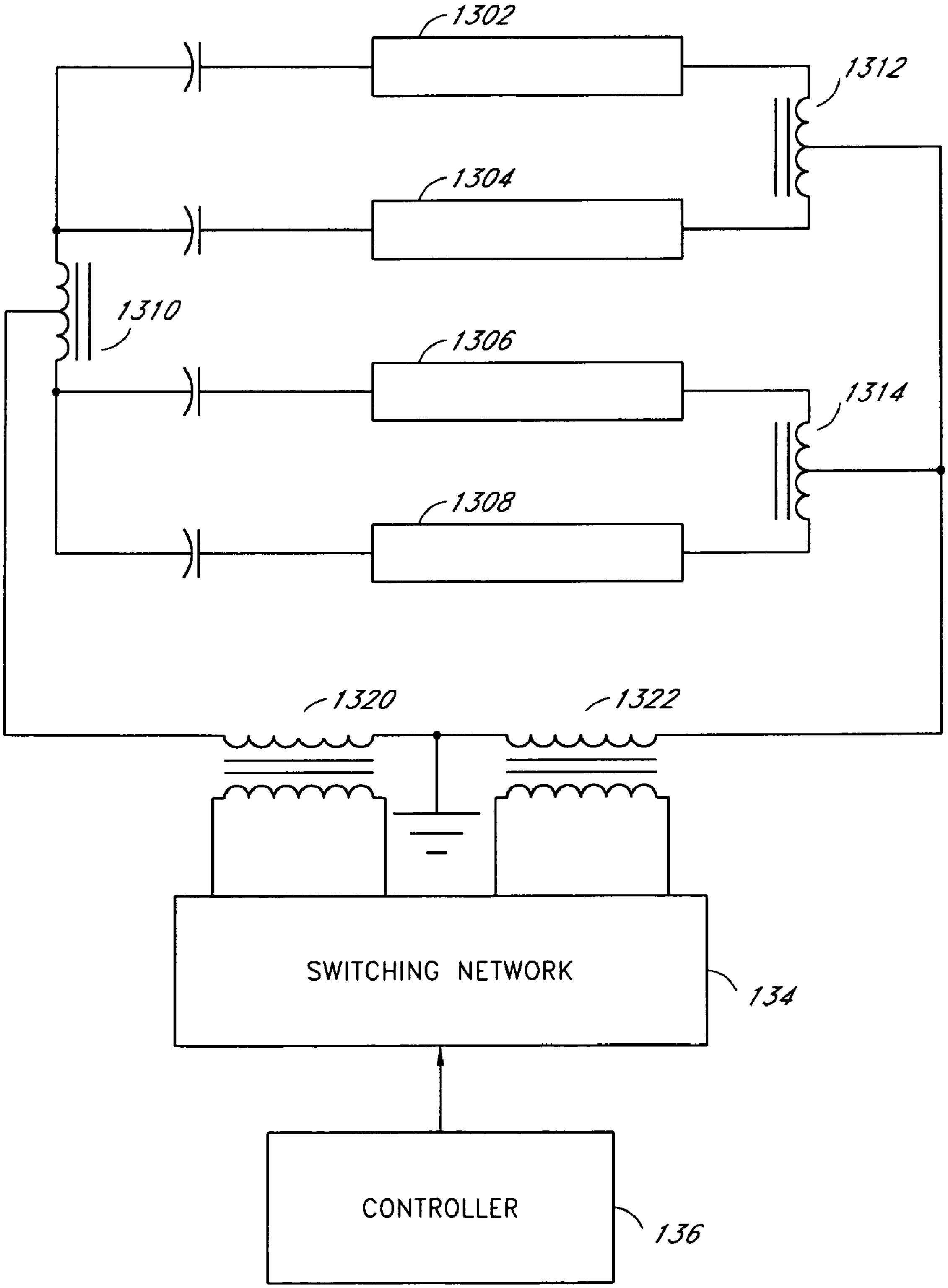
Figure 14:
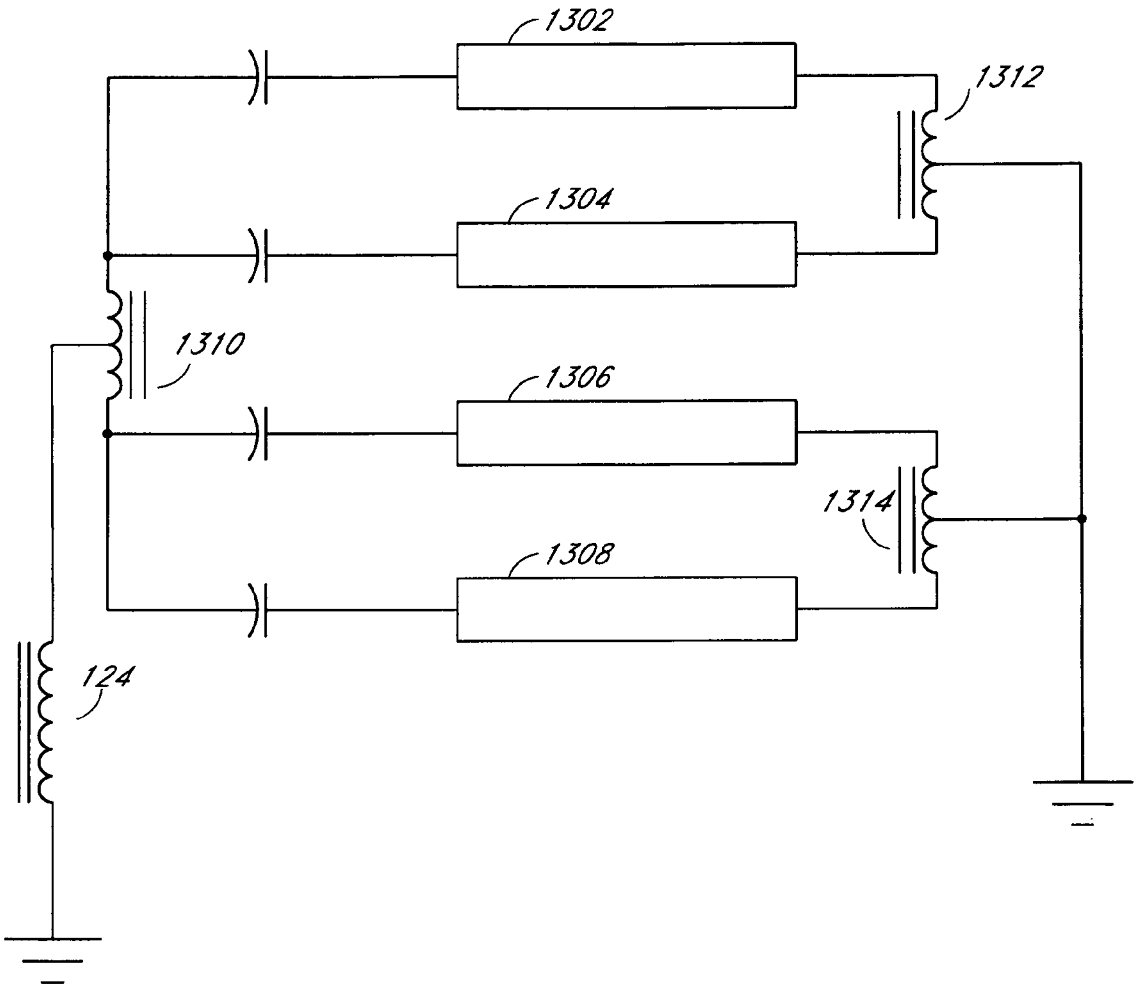
Figure 15:
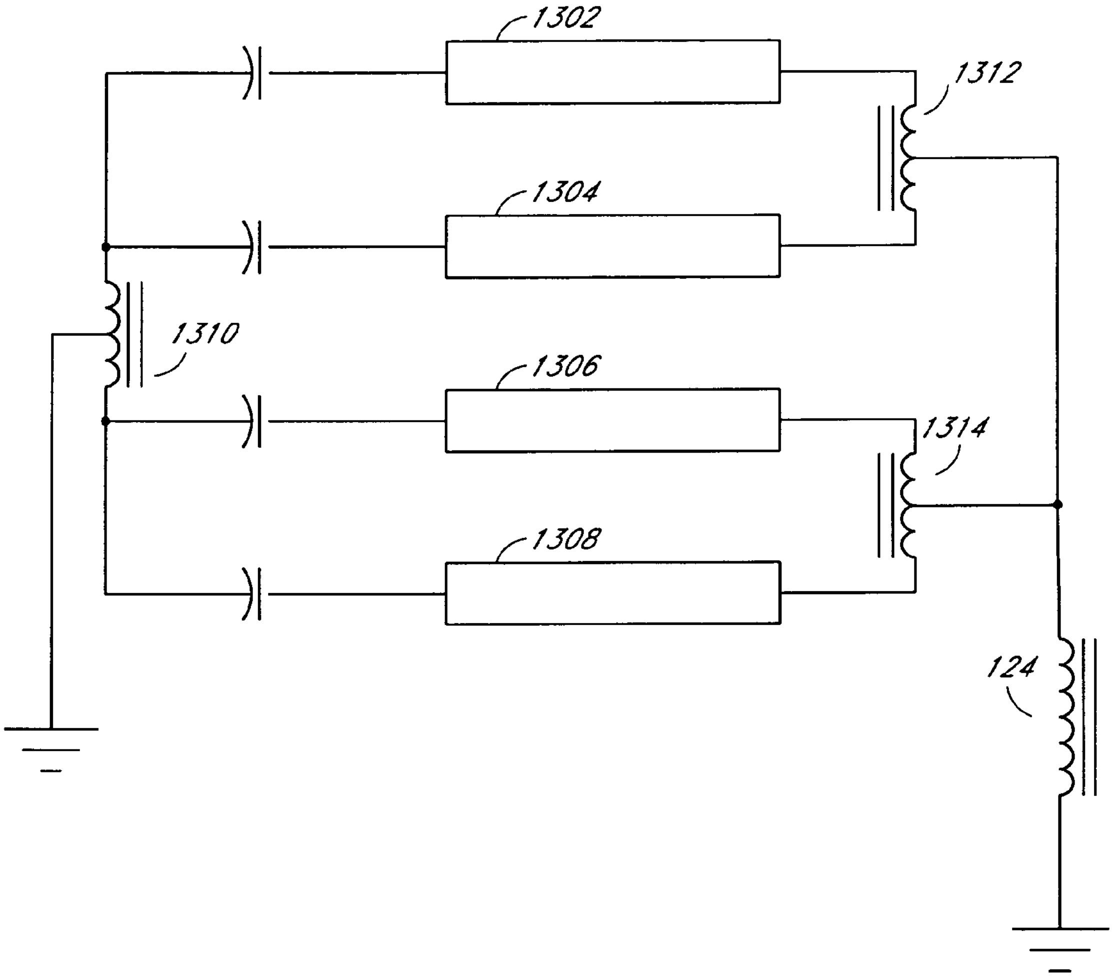

FIGS. 13, 14, and 15 illustrate a "split" or distributed configuration with two-way balancing transformers 1310, 1312, 1314 and CCFLs 1302, 1304, 1306, 1308. It should be noted that additional levels of the hierarchy can also be formed to balance, for example, 8, 16, or 32 lamps. FIG. 13 illustrates a configuration that is floating. In addition, FIG. 13 illustrates an alternative configuration for generating a drive for the lamps with a floating output. In the illustrated configuration, two separate inverter transformers 1320, 1322 are used to drive the lamps with opposing phases with a floating drive. As used herein, the term "floating drive" can include a drive signal floating with respect to DC and can also include balanced, differential, or split-phase drive. See, for example, commonly-owned U.S. patent application Ser. No. 10/903,636 filed on Jul. 30, 2004, titled "Split Phase Inverters For CCFL Backlight System," the disclosure of which is hereby incorporated by reference herein in its entirety. Other techniques will be readily determined by one of ordinary skill in the art. FIGS. 14 and 15 illustrate configurations electrically coupled to ground. As described earlier in connection with FIG. 1, and for all the configurations described herein, the illustrated capacitors are optional and can be placed virtually anywhere in series with the lamps.

In a "split" configuration, balancing transformers are present at both ends of the CCFLs 1302, 1304, 1306, 1308. As illustrated, the first two-way balancing transformer 1310 is coupled to the CCFLs 1302, 1304, 1306, 1308 at one end, and the second two-way balancing transformer 1312 and the third two-way balancing transformer 1314 are coupled to the CCFLs 1302, 1304, 1306, 1308 at the opposing end.

The first two-way balancing transformer 1310 balances a first combined current flowing through the first CCFL 1302 and the second CCFL 1304 and a second combined current flowing through the third CCFL 1306 and the fourth CCFL 1308. The second two-way balancing transformer 1312 balances current between the first CCFL 1302 and the second CCFL 1304. The third two-way balancing transformer 1314 balances current between the third CCFL 1306 and the fourth CCFL 1308.

Advantageously, with a split or distributed configuration, the leakage inductance of the balancing transformers 1310, 1312, 1314 is present at both ends of the CCFLs 1302, 1304, 1306, 1308. The CCFLs 1302, 1304, 1306, 1308, when operating, exhibit a substantial amount of parasitic capacitance to an adjacent ground plane. The combination of leakage inductance and parasitic capacitance operates to filter or suppress electromagnetic interference (EMI). Applicant has tested the split configuration and has determined that the split configuration offers superior EMI suppression than the single-sided configuration described earlier in connection with FIG. 1.

Figure 16:
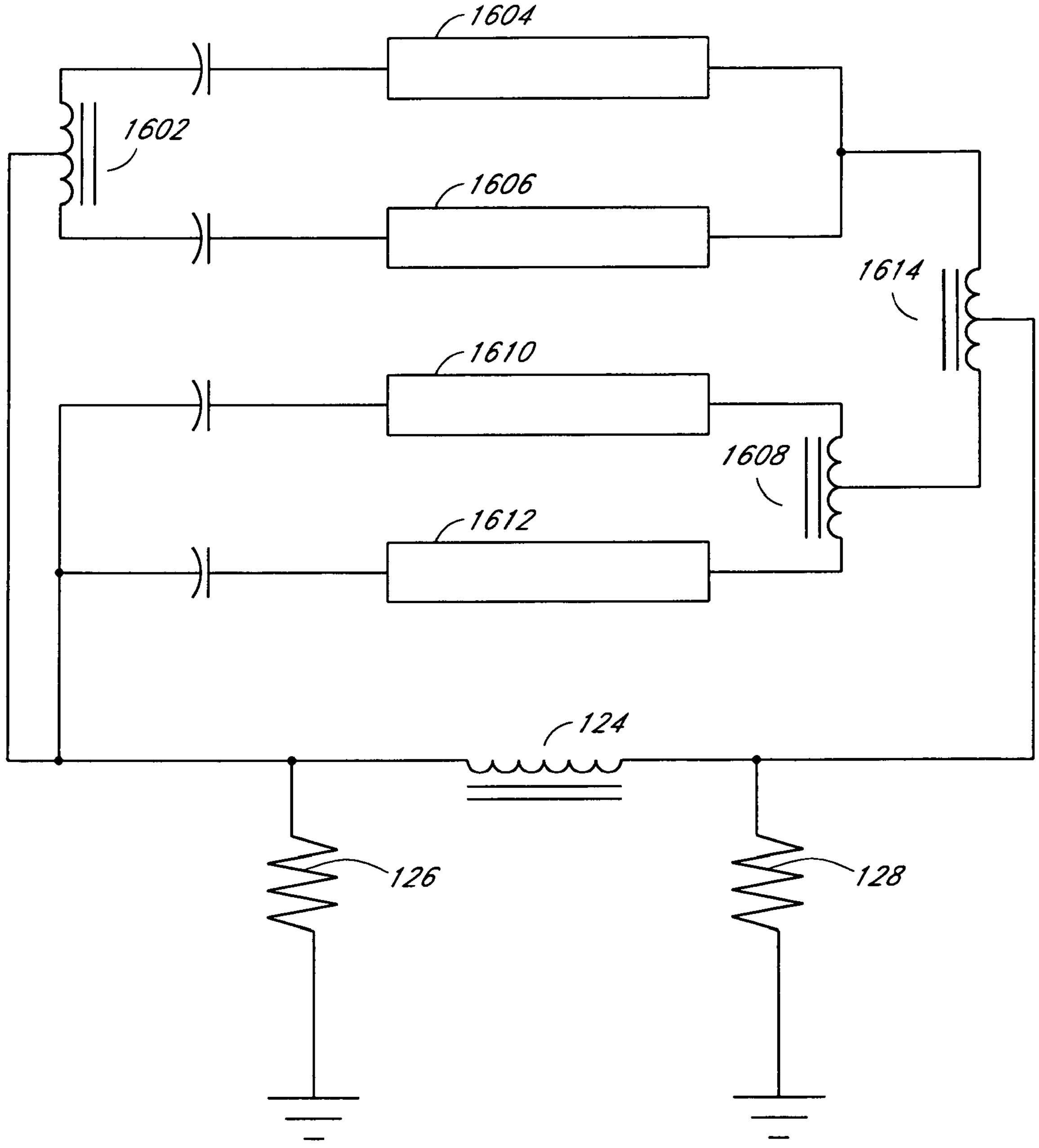
Figure 17:
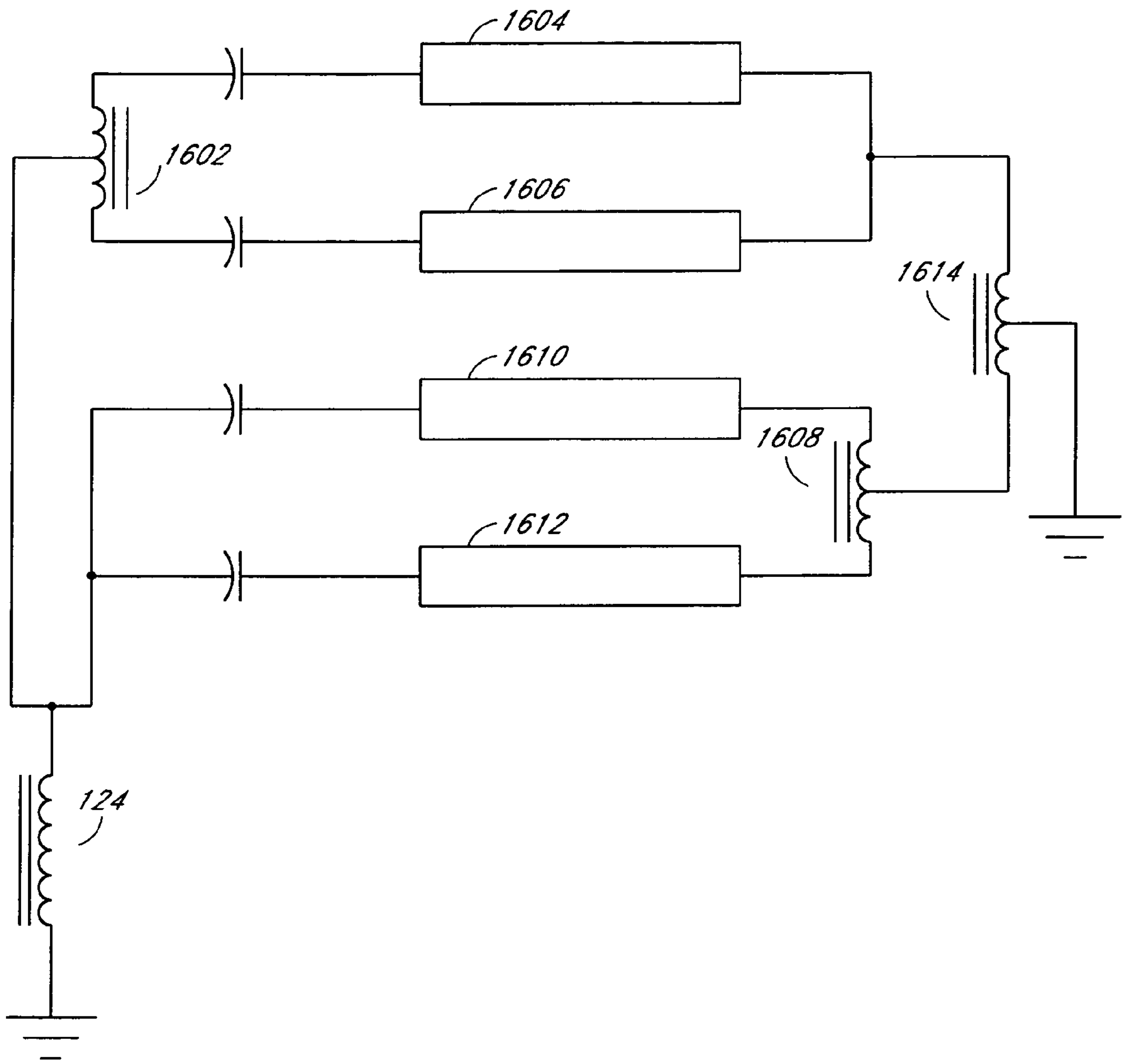
Figure 18:
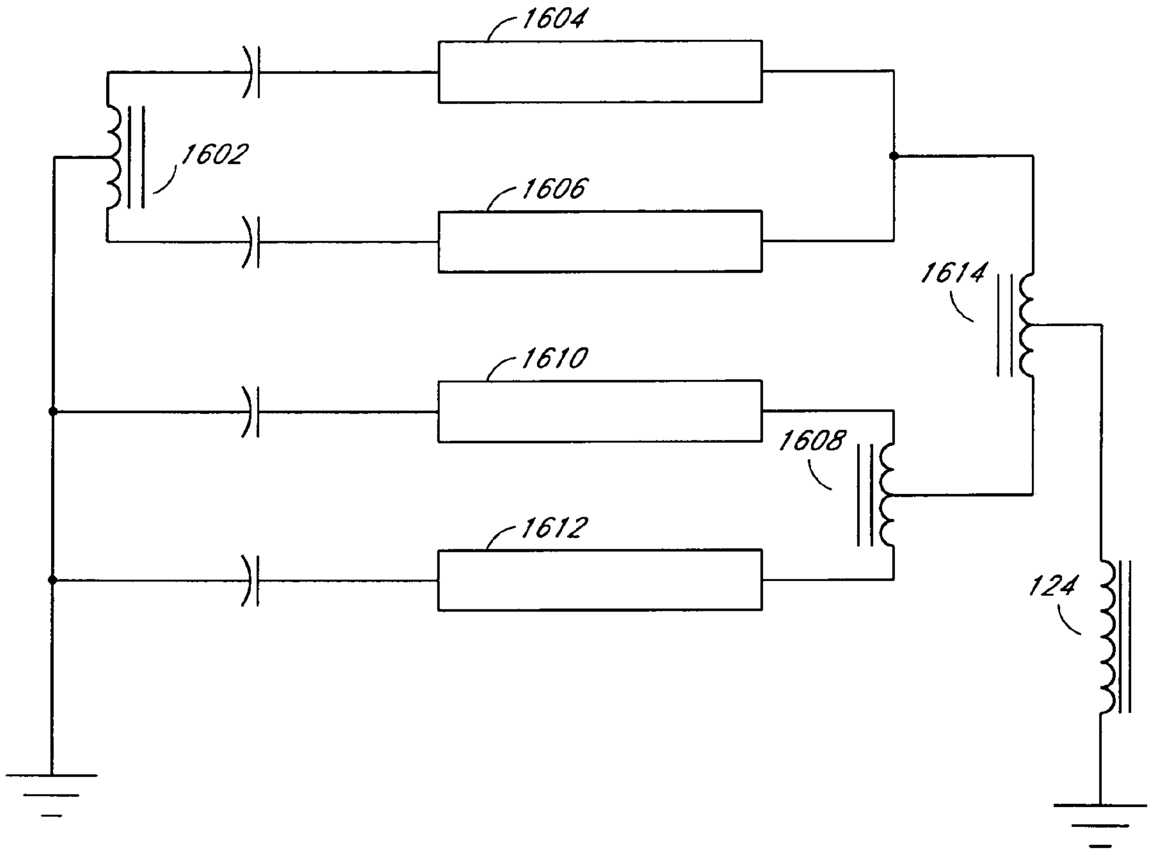

FIGS. 16, 17, and 18 illustrate a partially split configuration with two-way balancing transformers 1602, 1614, 1608 and CCFLs 1604, 1606, 1610, 1612. These partially split configurations offer some of the EMI suppression characteristics of the split configurations. FIG. 16 illustrates a floating configuration. FIGS. 17 and 18 illustrate configurations electrically coupled to ground.

The first two-way balancing transformer 1602 balances current for the first CCFL 1604 and the second CCFL 1606. The second two-way balancing transformer 1608 balances current for the third CCFL 1610 and the fourth CCFL 1612. A third two-way balancing transformer balances currents between the first two-way balancing transformer 1602 and the second two-way balancing transformer 1608.

Hybrid Configurations with "Ring" Transformers

FIGS. 19–30 illustrate hybrid configurations of two-way balancing transformers and "ring" balancing transformers. With the "ring" balancing transformers, separate transformers are used to balance individual CCFLs. A primary winding 1902 of a ring balancing transformer 1904 is operatively coupled in series with a CCFL 1906. A secondary winding 1908 of a ring balancing transformer is operatively coupled to other secondary windings of other ring balancing transformer in a "ring" 1910. Advantageously, the ring balancing technique can be used to balance current in lamps in arrangements of other than powers of 2 as illustrated, for example, by the 3 lamps balanced by the ring 1910.

Additional details of the "ring" balancing transformers is described in co-owned application titled "A Current Sharing Scheme For Multiple CCF Lamp Operation," filed on Oct. 5, 2004, U.S. application No.10/958,668 with Attorney Docket MSEMI.094A, the disclosure of which is hereby incorporated by reference herein in its entirety.

It will be understood that a two-way balancing transformer 1912 is not necessary to balance the current for many lamps as the current balanced by the first ring 1910 and a second ring 1914 can also be balanced by enlarging the ring. However, it is anticipated that in future mass-production applications, multiple CCFLs and corresponding "ring" balancing may be pre-wired, so that balancing among separate rings may be desirable as shown. It will also be understood that although 3 lamps per ring are illustrated, that in general, the number of lamps in a ring can vary (N lamps) in a very broad range and can include fewer lamps, such as 2, or more, such as 4.

The other principles and advantages of the configurations illustrated in FIGS. 19–27 are similar to those described earlier in connection with FIGS. 1 and 11–18, respectively, with ring transformers replacing selected two-way balancing transformers. Again, as discussed earlier, the illustrated capacitors are optional and can be placed anywhere in series with the CCFLs. In addition, the two-way balancing transformers can also include safety windings and can be coupled to diode limiting circuits.

Figure 19:
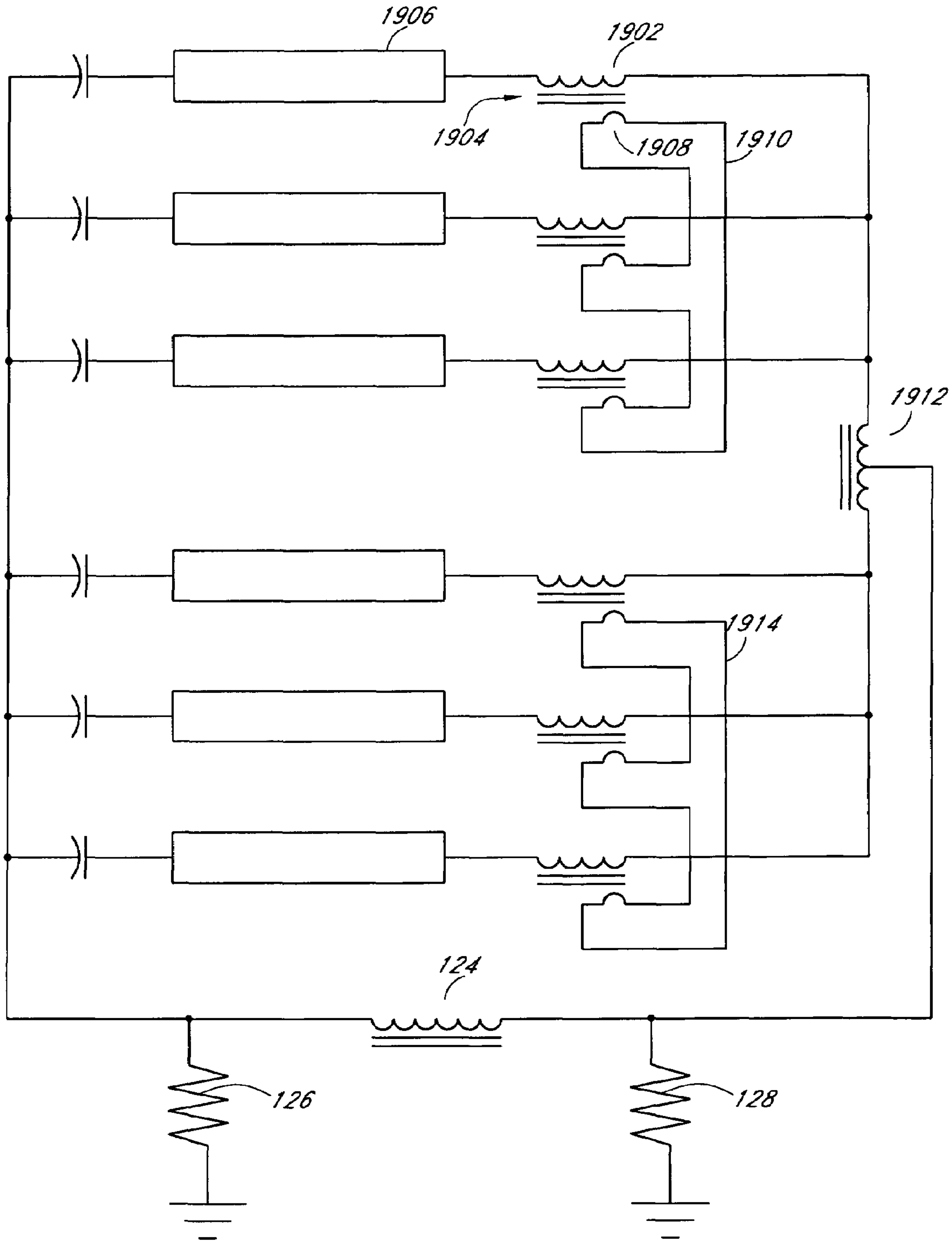
FIGS. 19–30 illustrate hybrid configurations of two-way balancing transformers and "ring" balancing transformers.
Figure 20:
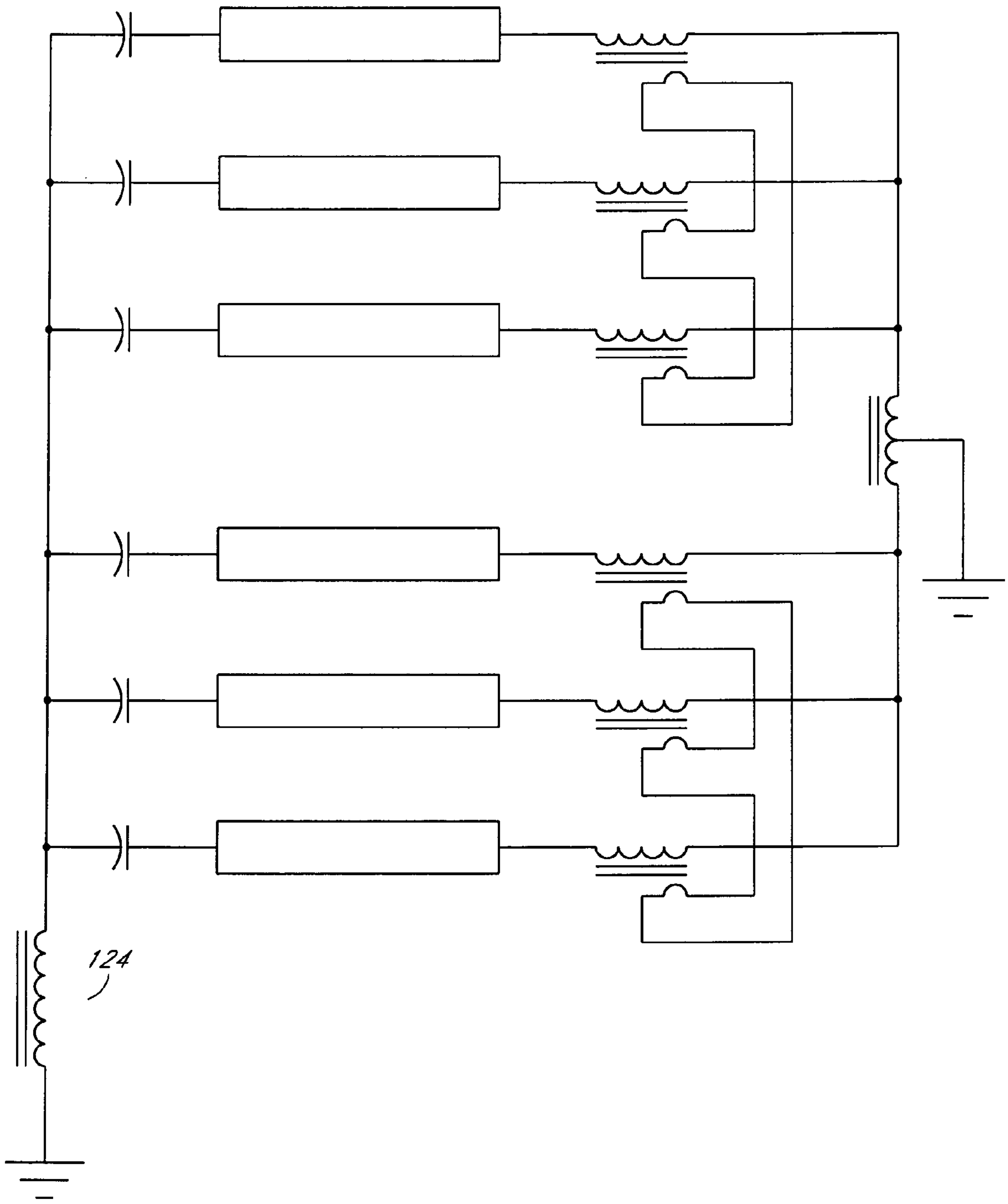
Figure 21:
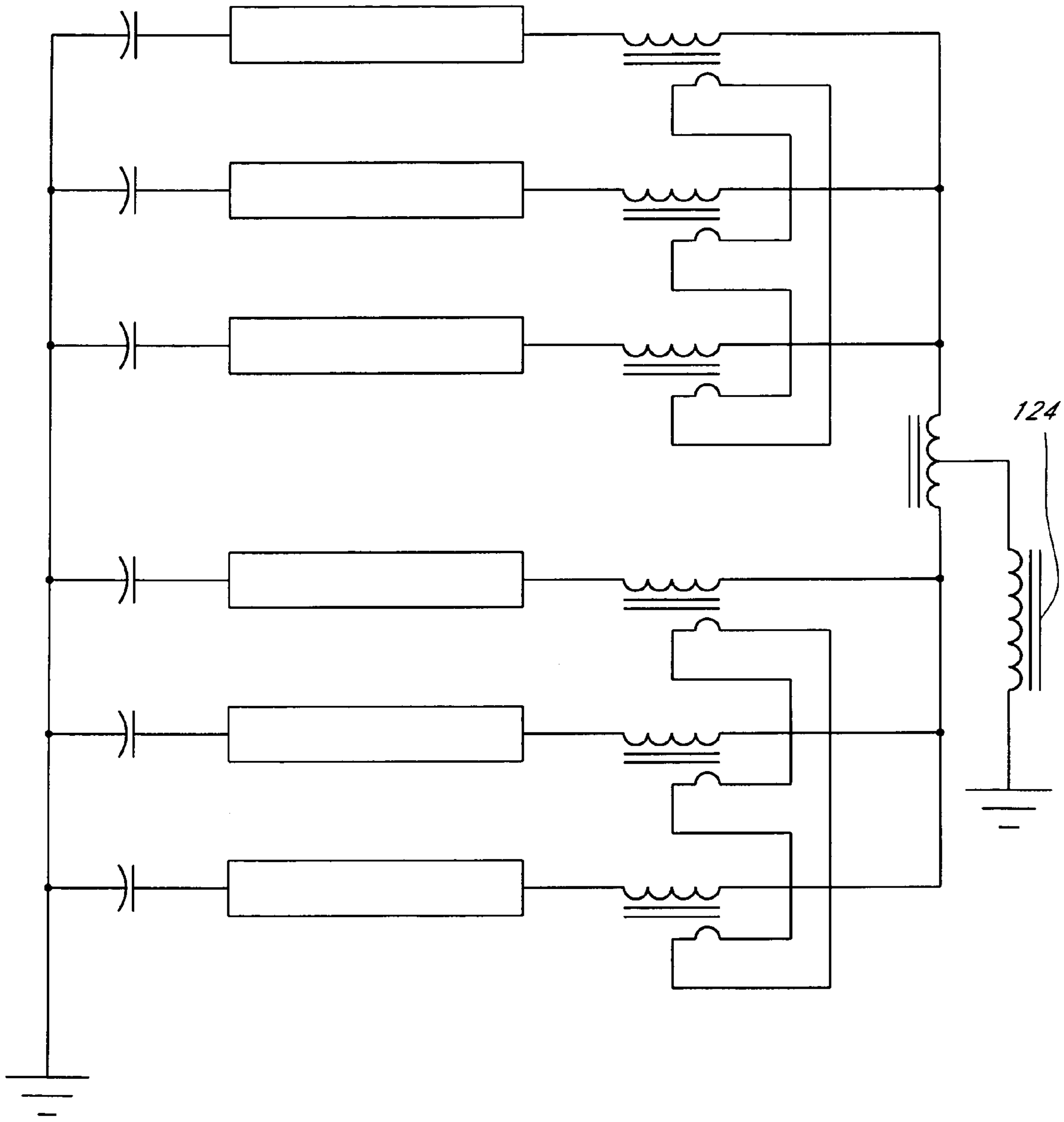
Figure 22:
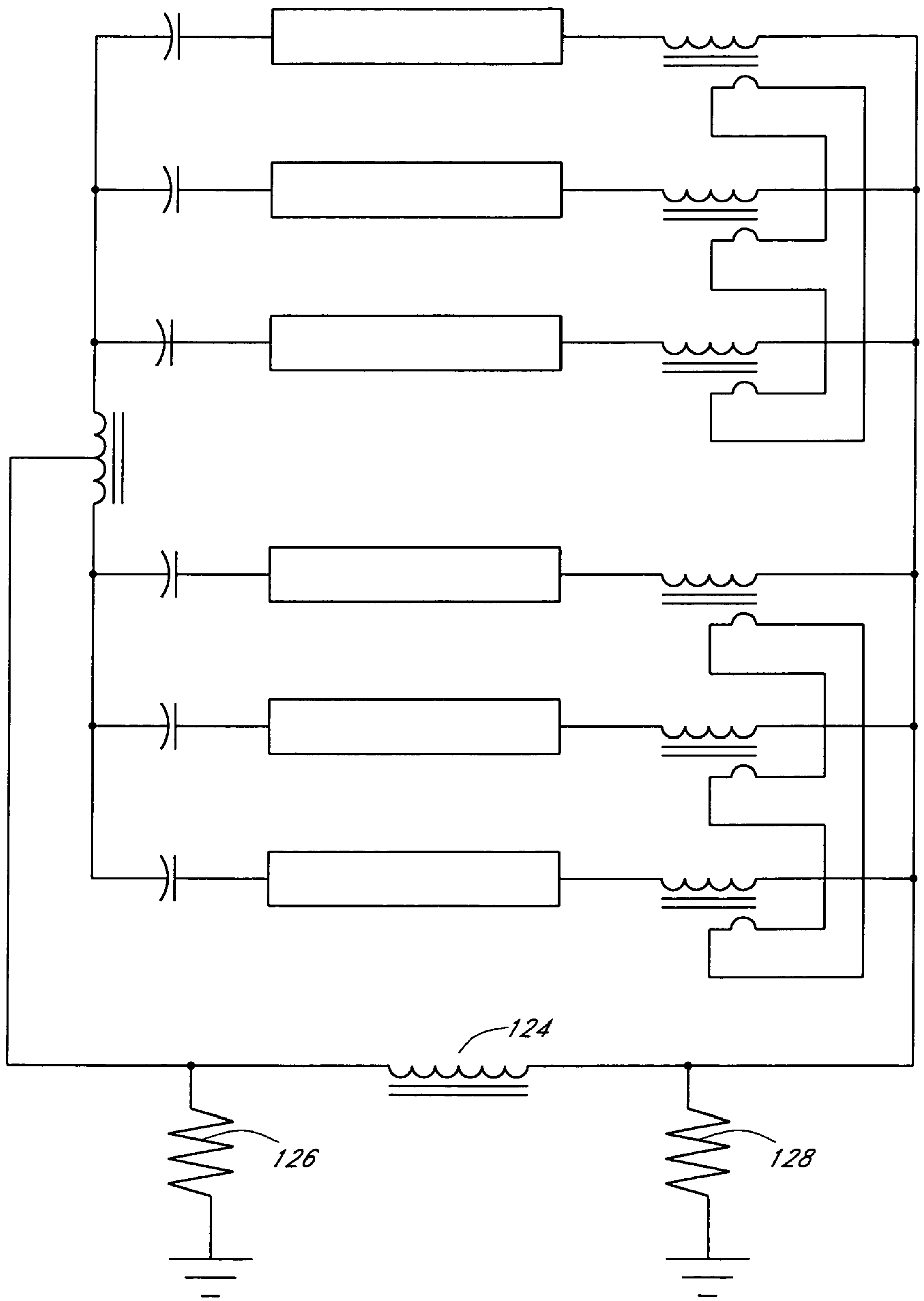
Figure 24:
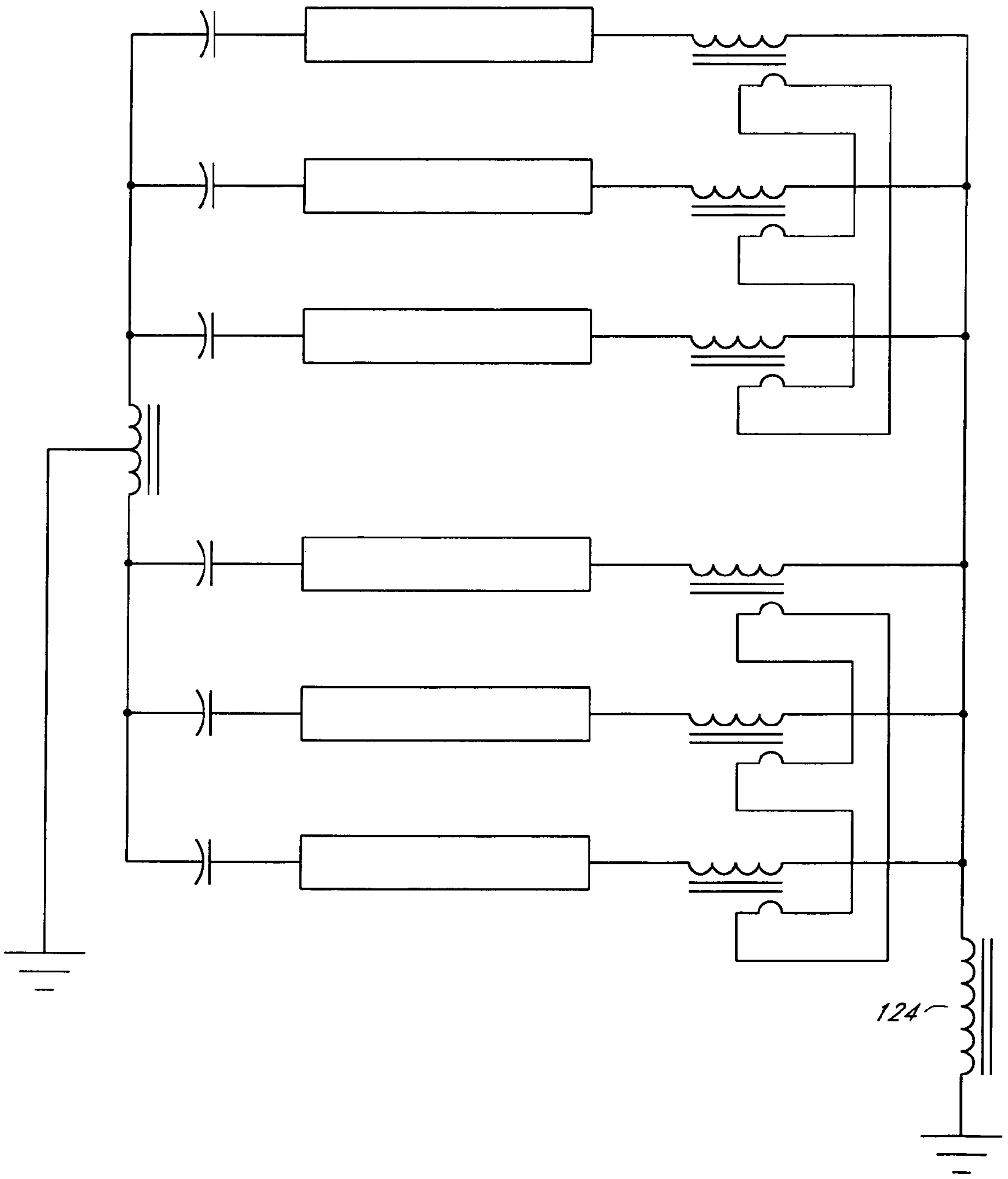
Figure 25:
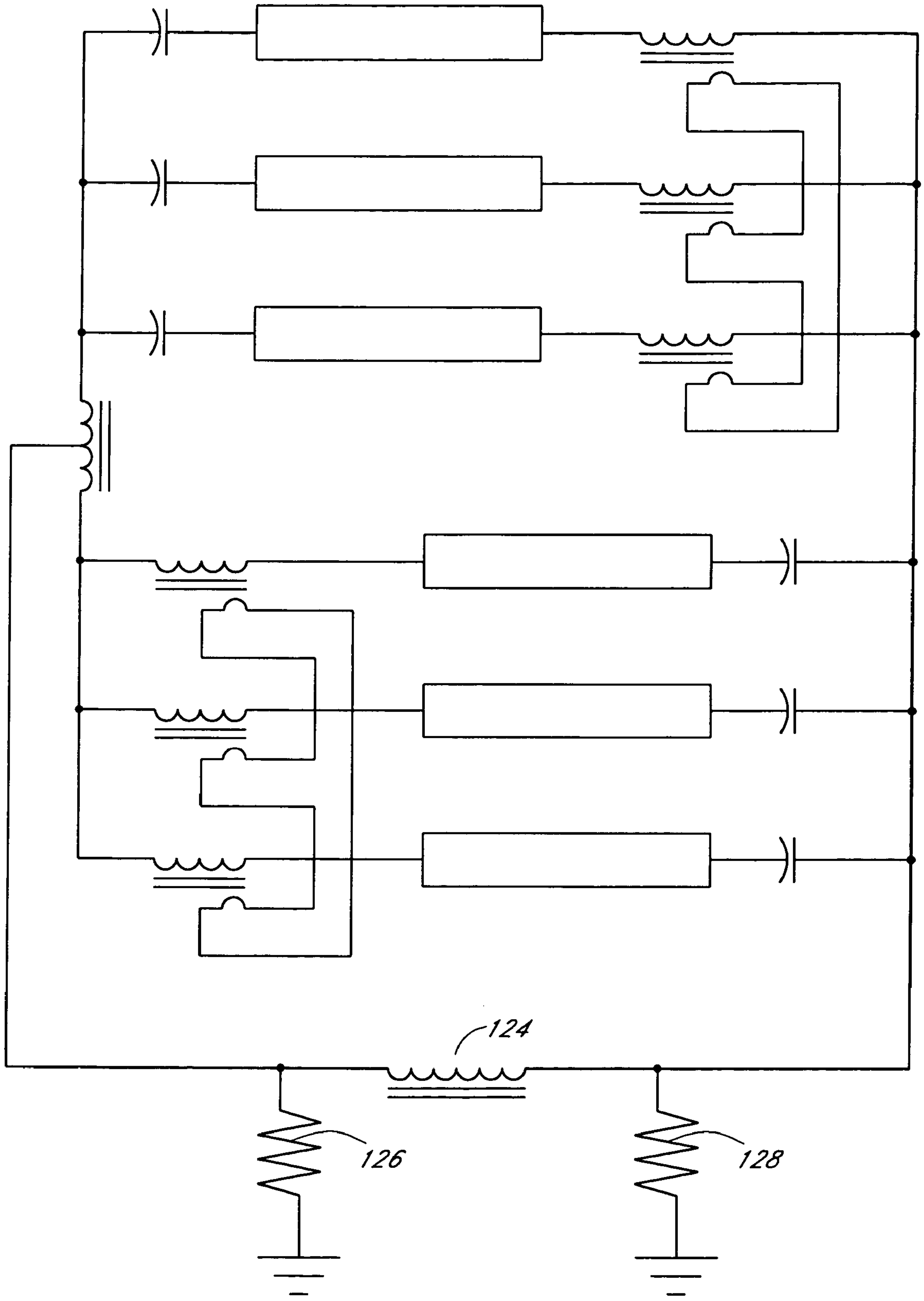
Figure 26:
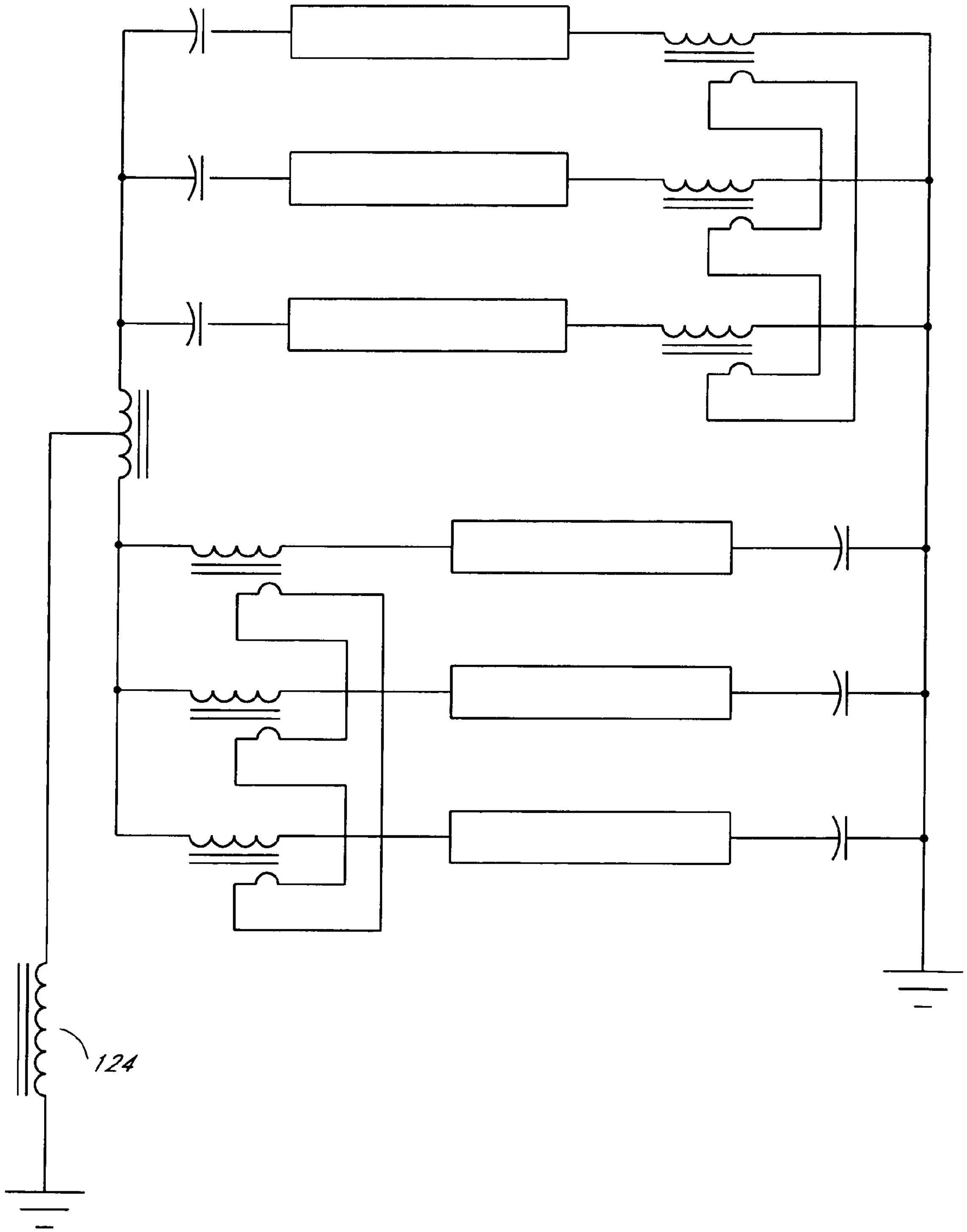
Figure 27:
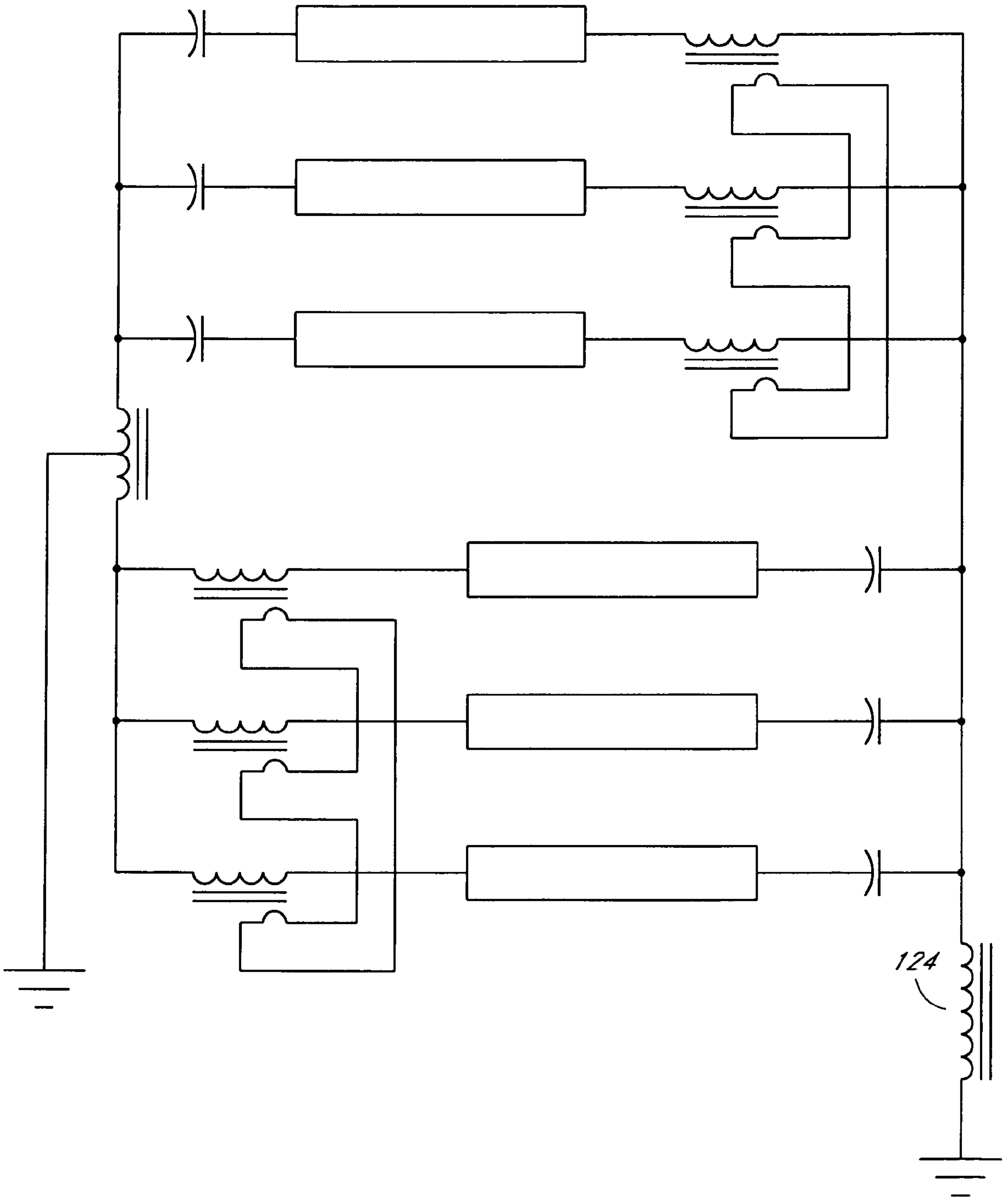

The configurations illustrated in FIGS. 19, 22, and 25 are floating and advantageously provide extra protection against arcing and corona discharge. The configurations illustrated in FIGS. 20, 21, 23, 24, 26, and 27 are electrically coupled to ground and can advantageously be used with inverter circuits that sense current on a secondary side of an inverter transformer.

Figure 23:
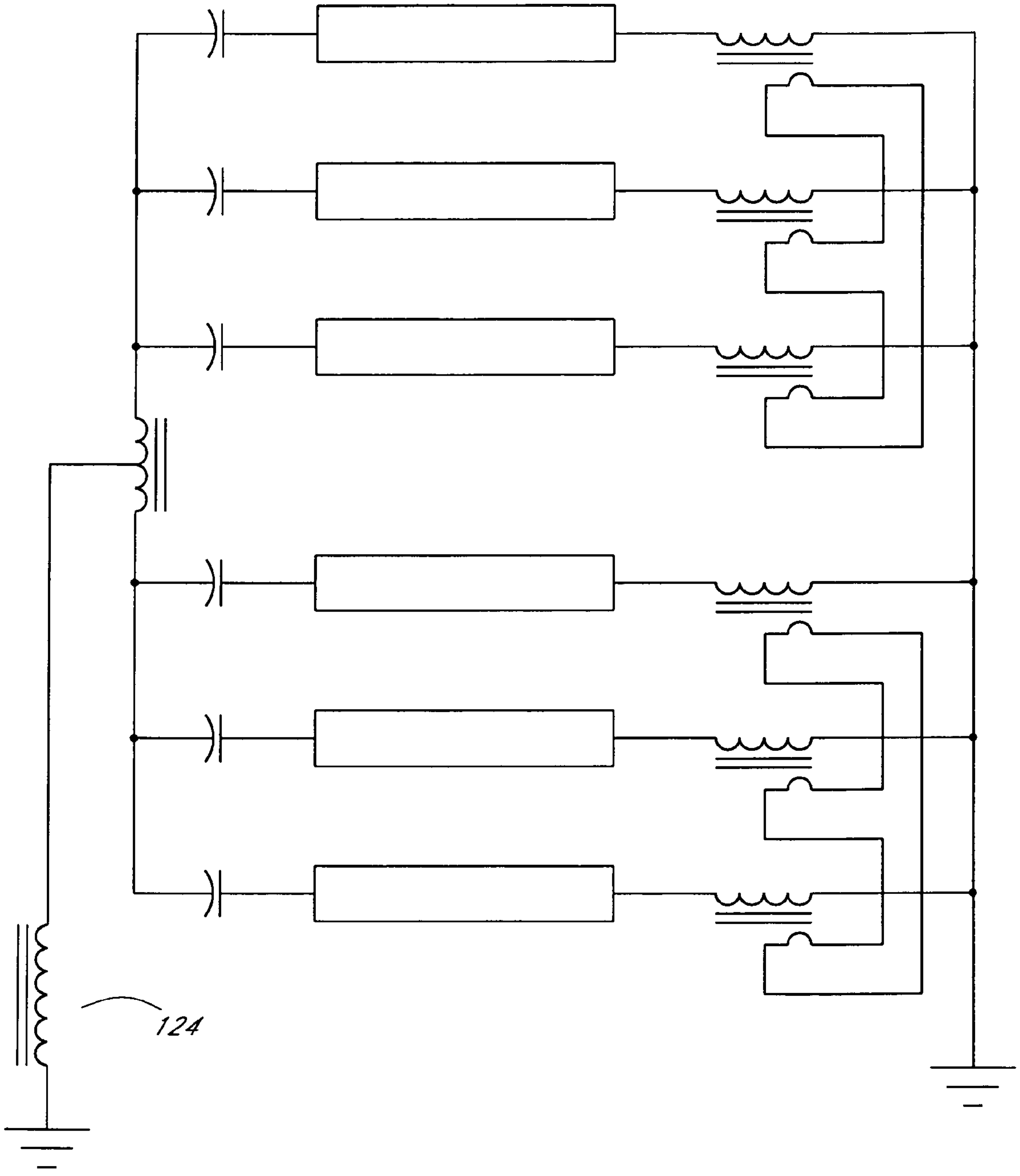

The configurations illustrated in FIGS. 22–24 correspond to "split" or distributed transformer configurations where a leakage inductance from balancing transformers is present at both ends of the CCFLs. This can advantageously suppress EMI. Partially split configurations illustrated in FIGS. 25–27 offers some of the EMI suppression characteristics of the configurations illustrated in FIGS. 22–24.

Figure 28:
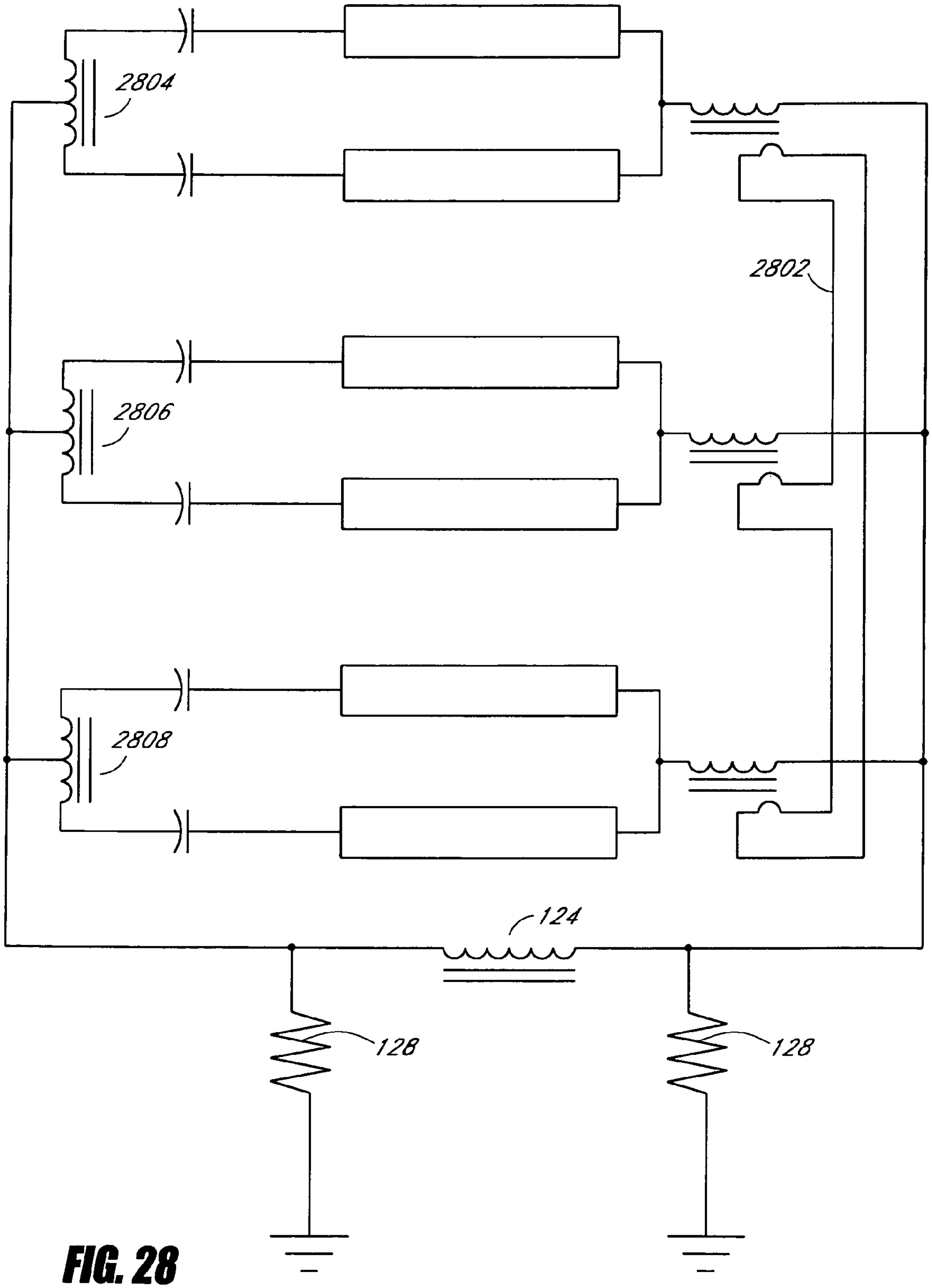

FIG. 28 illustrates a hybrid configuration of balancing transformers in a distributed tree including a plurality of two-way balancing transformers 2804, 2806, 2808 and a plurality of ring transformers in a floating configuration. Although 3 transformers are shown in a ring 2802, it will be understood that the number of transformers coupled in the ring 2802 can vary in a very broad range. In the illustrated configuration, the two-way balancing transformers 2804, 2806, 2808 and the plurality of ring transformers are on opposing ends of the CCFLs, thereby providing leakage inductance on both ends of CCFLs and suppressing EMI. The two-way balancing transformers 2804, 2806, 2808 balance the current between pairs of CCFLs, and the transformers in the ring 2802 balance the current among the two-way balancing transformers 2804, 2806, 2808.

Figure 29:
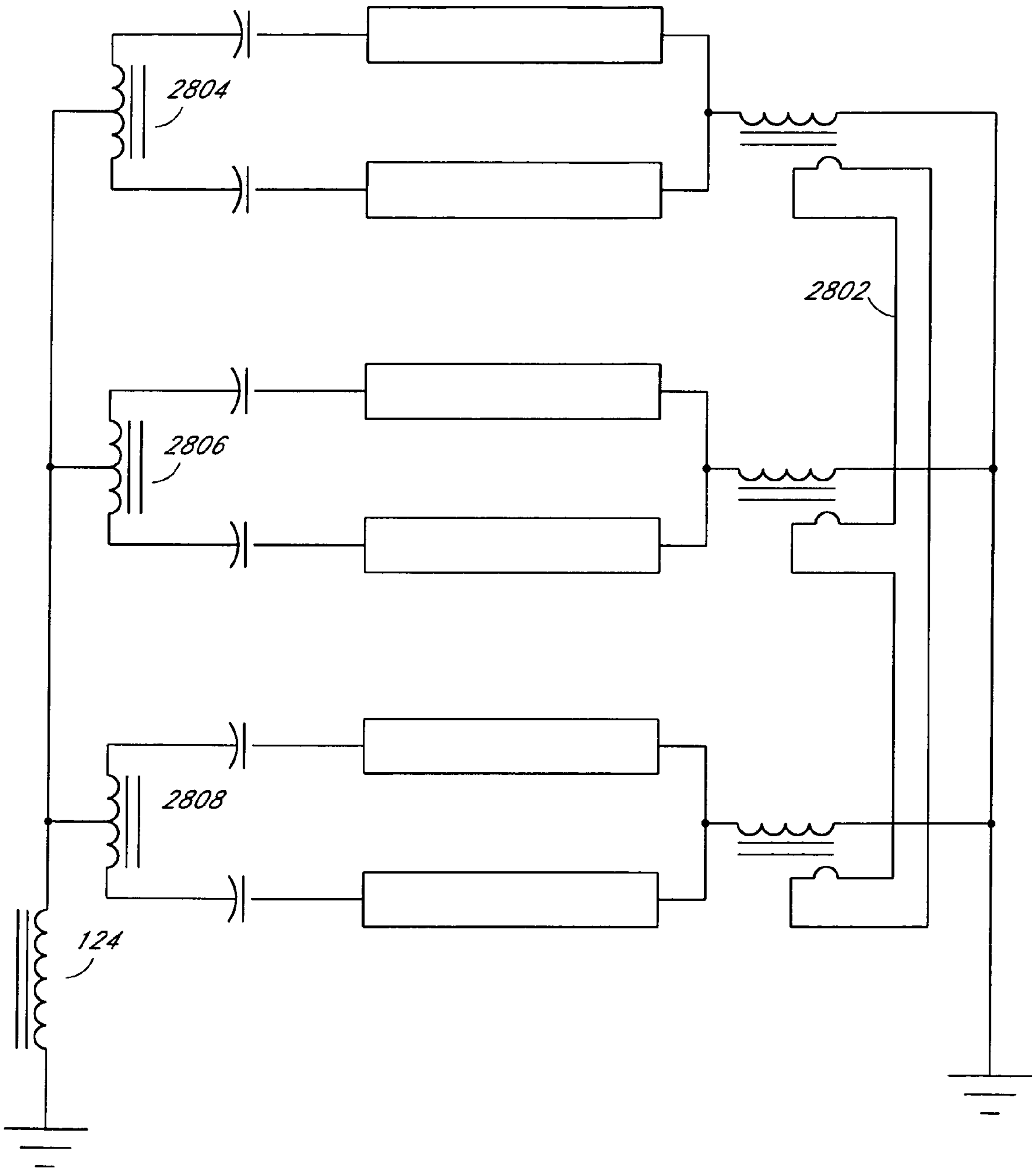
Figure 30:
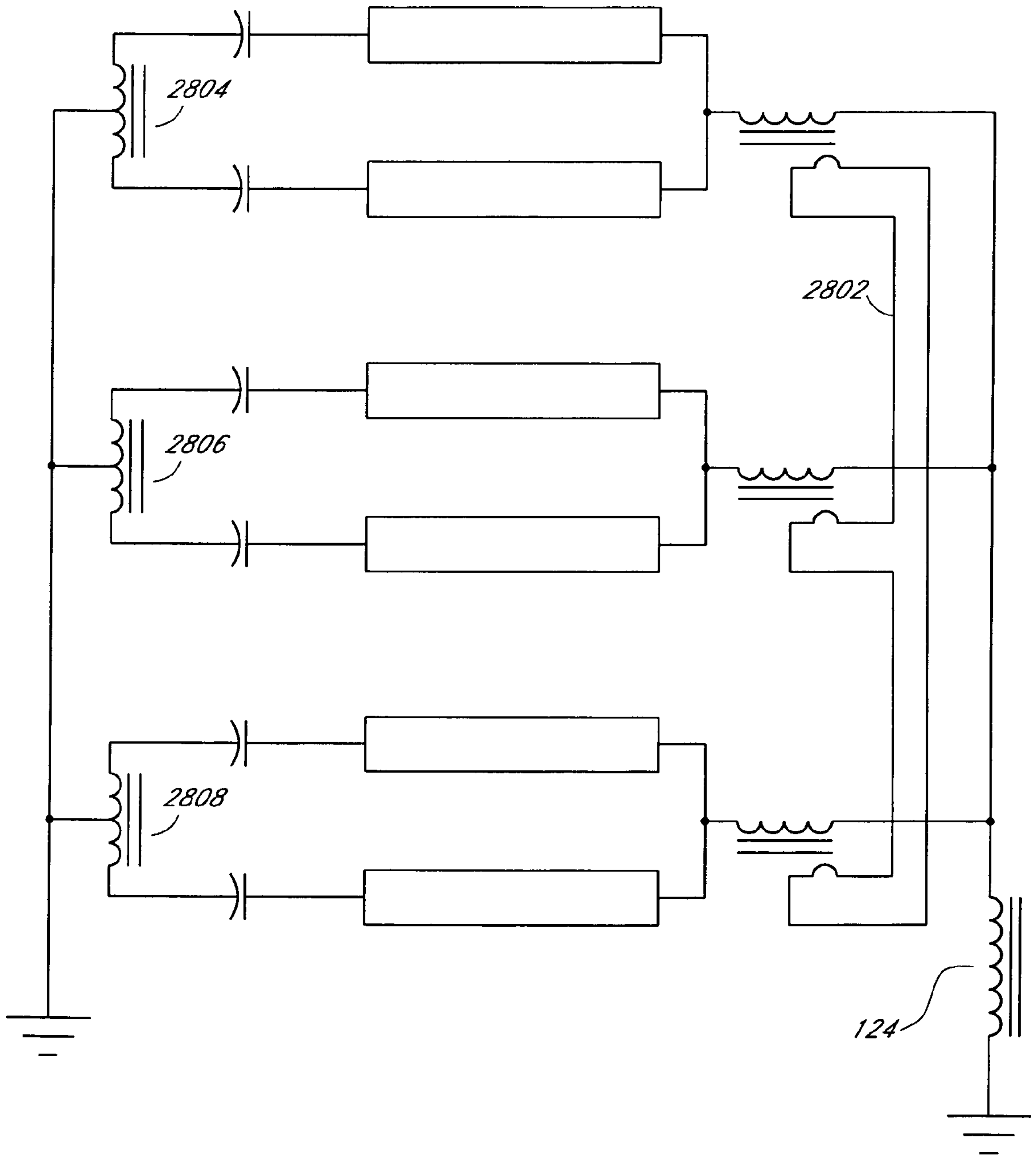

FIGS. 29 and 30 illustrate corresponding non-floating hybrid configurations.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined by the appended claims.

What is claimed is:

1. A method of paralleling lamps in a balanced manner, the method comprising:
- providing a plurality of at least 4 lamps;
- arranging at least 3 two-way balancing transformers in a hierarchical arrangement, wherein the hierarchical arrangement divides current in a balanced manner from a single current path to two current paths, and then from the two current paths to at least four current paths, wherein at least 1 of the at least 3 two-way balancing transformers incorporates a safety winding;
- operatively coupling the at least four current paths to the at least 4 lamps to parallel the lamps; and
- electrically coupling the safety winding to anti-parallel diodes.

2. The method as defined in claim 1, further comprising winding the balancing windings for the two-way balancing transformers in separate windings.

3. A lamp assembly comprising:
- a plurality of at least 4 lamps;
- means for arranging two-way balancing transformers in a straight tree, where the straight tree of two-way balancing transformer is operatively coupled to the plurality of at least 4 lamps to divide current evenly among the lamps; and
- means for limiting voltage in the two-way balancing transformers with safety windings.

4. The lamp assembly as defined in claim 3, wherein the lamp assembly is substantially floating with respect to ground.

5. An assembly of negative-impedance gas-discharge lamp loads comprising:
- a plurality of at least 4 lamp loads, where the lamp loads each have a first end and a second end;
- a first terminal and a second terminal for receiving power from a secondary winding of an inverter transformer for driving the plurality of lamp loads in parallel; and
- a split tree of two-way balancing transformers with at least 2 levels in the tree, where a first level is operatively coupled to first ends of the lamp loads and a second level is operatively coupled to the second ends of the lamp loads, where the first level is operatively coupled to the first terminal and the second level is operatively coupled to the second terminal.

6. The assembly as defined in claim 5, wherein the split tree further comprises at least one additional level between the first level or the second level and the first terminal or the second terminal.

7. The assembly as defined in claim 5, wherein none of the two-way balancing transformers is bifilar wound.

8. The assembly as defined in claim 5, wherein at least one of the two-way balancing transformers includes a safety winding electrically coupled to anti-parallel diodes.

9. The assembly as defined in claim 5, further comprising capacitors operatively coupled in series with the lamp loads.

10. The assembly as defined in claim 5, wherein the first terminal and the second terminal are substantially floating and not operatively coupled with respect to ground.

11. A method of paralleling negative-impedance gas-discharge lamp loads in a balanced manner, the method comprising:
- providing a plurality of at least 4 lamp loads;
- arranging at least 3 two-way balancing transformers in a split tree, wherein the split tree arrangement divides current in a balanced manner from at least a single current path to four current paths, wherein the split tree arrangement provides at least one two-way balancing transformer at both ends of the lamp loads; and
- operatively coupling the at least four current paths to the at least 4 lamp loads to parallel the lamp loads.

12. The method as defined in claim 11, further comprising incorporating a safety winding in the two-way balancing transformers and electrically coupling the safety winding to anti-parallel diodes.

13. The method as defined in claim 11, further comprising winding the balancing windings for each of the two-way balancing transformers in separate sections of a bobbin.

14. An assembly of negative-impedance gas-discharge lamp loads comprising:
- a plurality of at least 4 lamp loads; and
- means for splitting two-way balancing transformers between both ends of the lamp loads to divide current evenly among the lamp loads in a hierarchical configuration.

15. The assembly as defined in claim 14, wherein the assembly is substantially floating with respect to ground.

16. An assembly of negative-impedance gas-discharge lamp loads comprising:
- a plurality of at least 4 lamp loads, where the lamp loads each have a first end and a second end;

a first terminal and a second terminal for receiving power from an inverter transformer for driving the plurality of lamp loads in parallel; and a partially split tree of two-way balancing transformers, wherein the partially split tree is coupled to the plurality of at least 4 lamp loads and to the first terminal and the second terminal, wherein at least a first two-way balancing transformer of the partially split tree is operatively coupled to first ends of corresponding lamp loads and at least a second two-way balancing transformer is operatively coupled to second ends of corresponding lamp loads, and where a third two-way balancing transformer is operatively coupled to the first two-way balancing transformer or the second two-way balancing transformer.

17. The assembly as defined in claim 16, wherein none of the two-way balancing transformers is bifilar wound.

18. The assembly as defined in claim 16, wherein at least one of the two-way balancing transformers includes a safety winding electrically coupled to anti-parallel diodes.

19. The assembly as defined in claim 16, further comprising capacitors operatively coupled in series with the lamp loads.

20. The assembly as defined in claim 16, wherein the first terminal and the second terminal are substantially floating and not operatively coupled with respect to ground.

21. A method of paralleling negative-impedance gas-discharge lamp loads in a balanced manner, the method comprising:

providing a plurality of at least 4 lamp loads with first ends and second ends; arranging at least 3 two-way balancing transformers in a partially split tree, wherein the partially split tree arrangement divides current in a balanced manner from a single current path to at least four current paths, wherein at least one two-way balancing transformer is operatively coupled to first ends of two or more lamp loads and at least another two-way balancing transformer is operatively coupled to second ends of another two or more lamp loads; and operatively coupling the at least four current paths to the at least 4 lamp loads to parallel the lamp loads.

22. The method as defined in claim 21, further comprising incorporating a safety winding in the two-way balancing transformers and electrically coupling the safety winding to anti-parallel diodes.

23. The method as defined in claim 21, further comprising winding the balancing windings for the two-way balancing transformers in separate windings.

24. An assembly of negative-impedance gas-discharge lamp loads comprising:

a plurality of lamp loads, where the lamp loads each have a first end and a second end;

a first terminal and a second terminal for receiving power from at least one inverter transformer for driving the plurality of lamp loads in parallel;

a first plurality of balancing transformers operatively coupled between the first ends of the plurality of lamp loads and the first terminal; and a second plurality of balancing transformers operatively coupled between the second ends of the plurality of lamp loads and the second terminal.

* * * * *

UNITED STATES PATENT AND TRADEMARK OFFICE

CERTIFICATE OF CORRECTION

PATENT NO. : 7,250,726 B2
APPLICATION NO. : 10/970243
DATED : July 31, 2007
INVENTOR(S) : Newton E. Ball It is certified that error appears in the above-identified patent and that said Letters Patent is hereby corrected as shown below:

At column 2, page 2 (U.S. Patent Documents), line 34, delete “8,320,329” and insert -- 6,320,329 --, therefor.

At column 1, page 3 (U.S. Patent Documents), line 15, delete “2003/0141852” and insert -- 2003/0141829 --, therefor.

At column 1, line 14, after “Driving” insert -- Multiple --, therefor.

At column 1, line 40, please delete “CCFLS” and insert -- CCFLs --, therefor.

At column 5, line 37, after “second level” delete “level”.

At column 16, line 26, In Claim 24, delete “ends” and insert -- end --, therefor.

At column 16, line 29, In Claim 24, delete “ends” and insert -- end --, therefor.

Signed and Sealed this

Fourth Day of December, 2007

JON W. DUDAS

*Director of the United States Patent and Trademark Office*